(12) United States Patent
Ohba et al.

(10) Patent No.: US 11,450,036 B2
(45) Date of Patent: Sep. 20, 2022

(54) IMAGE PROCESSING APPARATUS AND DISPLAY IMAGE GENERATING METHOD

(71) Applicant: Sony Interactive Entertainment Inc., Tokyo (JP)

(72) Inventors: Akio Ohba, Kanagawa (JP); Takayuki Shinohara, Tokyo (JP); Shinya Wada, Kanagawa (JP); Akihiko Sugawara, Kanagawa (JP); Takayuki Ishida, Tokyo (JP); Hiroyuki Segawa, Kanagawa (JP)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 16/960,991

(22) PCT Filed: Jan. 30, 2018

(86) PCT No.: PCT/JP2018/003040
§ 371 (c)(1),
(2) Date: Jul. 9, 2020

(87) PCT Pub. No.: WO2019/150450
PCT Pub. Date: Aug. 8, 2019

(65) Prior Publication Data
US 2020/0342636 A1 Oct. 29, 2020

(51) Int. Cl.
*G06T 11/00* (2006.01)
*G06T 7/246* (2017.01)
*G06T 3/40* (2006.01)

(52) U.S. Cl.
CPC ............ *G06T 11/001* (2013.01); *G06T 3/40* (2013.01); *G06T 7/246* (2017.01)

(58) Field of Classification Search
CPC .......... G06T 11/001; G06T 7/246; G06T 3/40
See application file for complete search history.

(56) References Cited

U.S. PATENT DOCUMENTS 7,446,780 B1* 11/2008 Everitt .................... G06T 15/50
345/473
7,750,927 B2 7/2010 Ito
(Continued)

FOREIGN PATENT DOCUMENTS

JP 2003115056 A 4/2003
JP 2006337771 A 12/2006
(Continued)

OTHER PUBLICATIONS

International Search Report for corresponding PCT Application No. PCT/JP2018/003040, 4 pages, dated Mar. 20, 2018.
(Continued)

*Primary Examiner* — Samantha (Yuehan) Wang
(74) *Attorney, Agent, or Firm* — Matthew B. Dernier, Esq.

(57) ABSTRACT

An input information acquiring section accepts a user's operation. A texture region acquiring section acquires a region of a display image to be presented by use of a texture. A velocity acquiring section acquires for each pixel a movement velocity vector of the texture on a plane of the display image. A texture referencing section adjusts a reference range in an axial direction of the velocity vector in keeping with a magnitude of the movement velocity, before sampling texel values. A pixel value determining section determines a pixel value on the basis of the texel values. An output section outputs the display image.

12 Claims, 21 Drawing Sheets (a)

(b)

(56) References Cited

U.S. PATENT DOCUMENTS

| | | | |
|---|---|---|---|
| 10,345,900 B2* | 7/2019 | Woo | G06T 15/04 |
| 10,353,464 B2* | 7/2019 | Skogo | G06F 3/013 |
| 10,580,192 B2 | 3/2020 | Ohba | |
| 10,721,456 B2* | 7/2020 | Sasaki | H04N 13/15 |
| 2002/0012002 A1* | 1/2002 | Ito | G06T 15/04 |
| | | | 345/552 |
| 2007/0030359 A1 | 2/2007 | Ito | |
| 2014/0184641 A1* | 7/2014 | Naganawa | G09G 5/377 |
| | | | 345/629 |
| 2017/0076503 A1* | 3/2017 | Tamaoki | G06F 3/0482 |
| 2018/0184072 A1* | 6/2018 | Yoshimura | G06T 7/248 |
| 2019/0057537 A1 | 2/2019 | Ohba | |
| 2019/0391400 A1* | 12/2019 | Funabiki | G02B 27/0101 |

FOREIGN PATENT DOCUMENTS

| | | | |
|---|---|---|---|
| JP | 2007041196 A | 2/2007 | |
| JP | 2008502978 A | 1/2008 | |
| JP | 2017091483 A | 5/2017 | |
| WO | 2005124692 A1 | 12/2005 | |

OTHER PUBLICATIONS

International Preliminary Report on Patentability and Written Opinion for corresponding PCT Application No. PCT/JP2018/003040, 11 pages, dated Aug. 13, 2020.

* cited by examiner (a)   (b)

FIG. 11
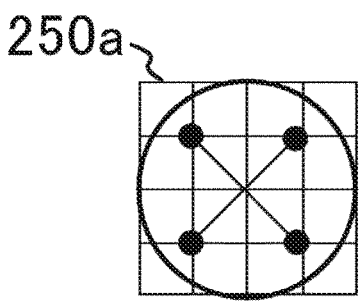
250a
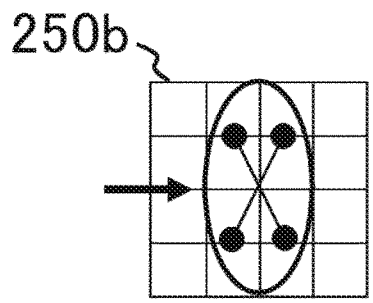
250b
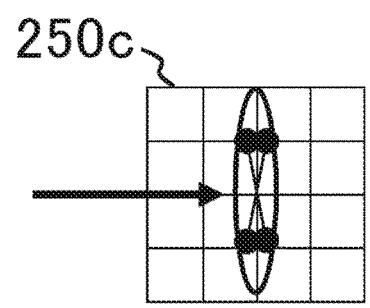
250c
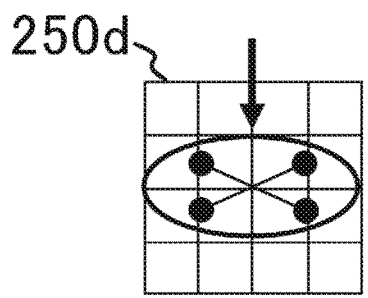
250d
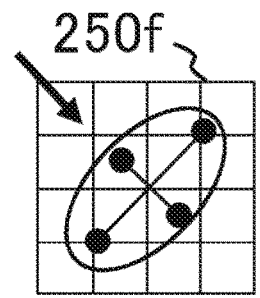
250f
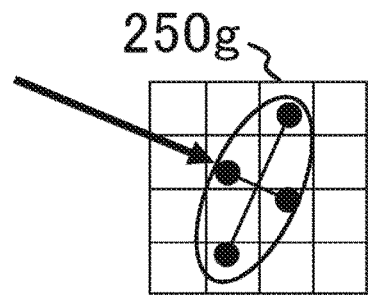
250g
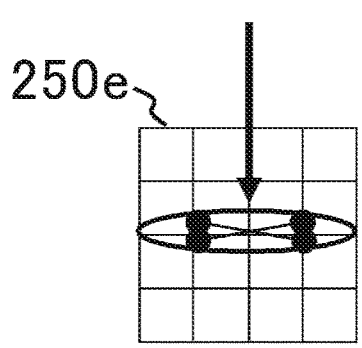
250e
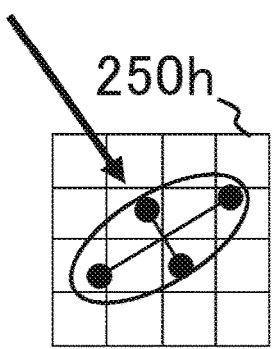
250h
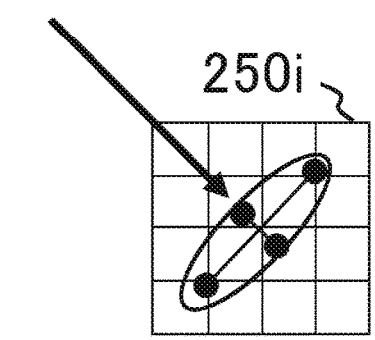
250i FIG.15
(a) $1.0 \leqq \max(Su, Sv) < 4.0$ 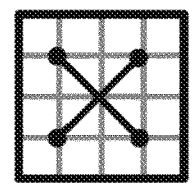
(b) $4.0 \leqq \max(Su, Sv) < 6.0$ 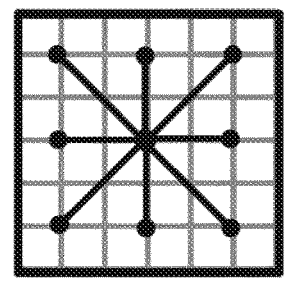
(c) $6.0 \leqq \max(Su, Sv) < 8.0$ 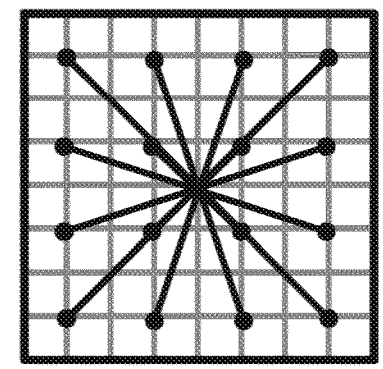
⋮

FIG.20
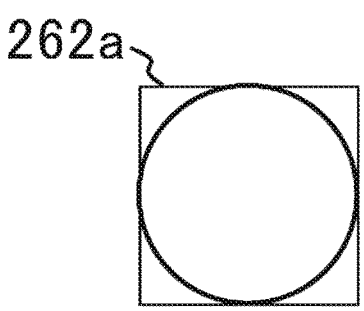
262a
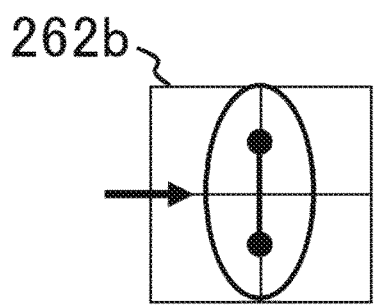
262b
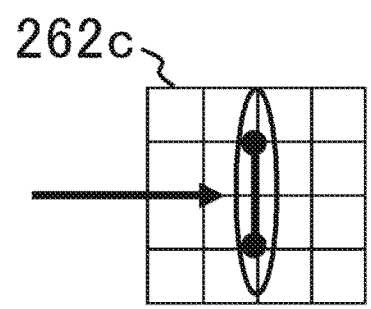
262c
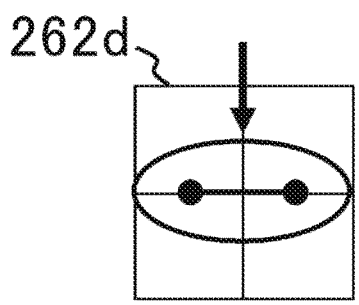
262d
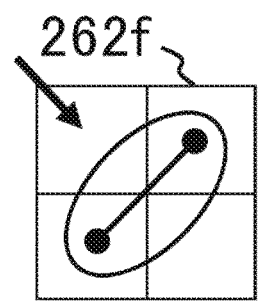
262f
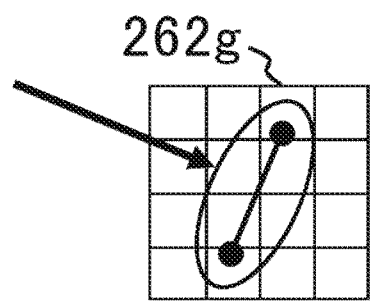
262g
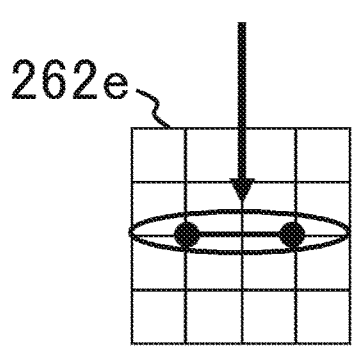
262e
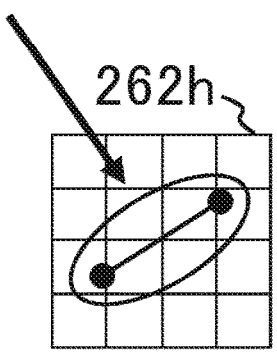
262h
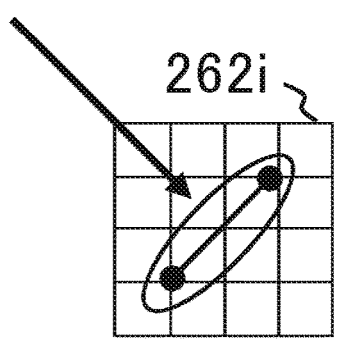
262i

IMAGE PROCESSING APPARATUS AND DISPLAY IMAGE GENERATING METHOD

TECHNICAL FIELD

The present invention relates to an image processing apparatus and a display image generating method for generating display images using texture data.

BACKGROUND ART

In recent years, image display techniques have continued to progress, making it easy to acquire information and enjoy videos on diverse platforms such as mobile terminals, tablets, television receivers, personal computers, and head-mounted display devices. In particular, high-resolution display apparatuses have been implemented to offer high-definition image-viewing experience with realistic sensations in familiar settings. Further, there have been proposed techniques using the time integration capability of human visual perception and aimed at successively displaying images in multiple patterns with thinned-out pixels during image movement. The result is that the images are perceived with a resolution that is one prior to the thinning-out of pixels (e.g., see PTL 1).

[Citation List] [Patent Literature]
[PTL 1] Japanese Patent Laid-open No. 2006-337771

SUMMARY

Technical Problem

As the resolution of a display apparatus is increased, the area of a target expressed by one pixel is reduced. Thus, during movement of the image, the higher the resolution, the more likely the pixel expressing the same area is moved to a position distant from the preceding frame. This can give the impression of discontinuity or a sense of strangeness. However, improving both the resolution and the frame rate incurs larger data sizes of the original image and heavier burden of display processing. Uniformly performing such processes as suppressing the high-frequency component to eliminate discontinuity can impair the intrinsic high-definition image display capability of the display apparatus.

The present invention has been made in view of the above circumstances and provides, as an object thereof, a technology of enabling display images to be viewed stably and appropriately regardless of the resolution or the frame rate of the display apparatus.

[Solution to Problem] According to an embodiment of the present invention, there is provided an image processing apparatus. This image processing apparatus includes a velocity acquiring section configured to acquire a movement velocity vector of a texture relative to a plane of a display image for each pixel in the display image, a texture referencing section configured to adjust a reference range on the basis of the movement velocity vector, before sampling texel values in the reference range, a pixel value determining section configured to determine a pixel value on the basis of the sampled texel values, and an output section configured to output data of the display image of which the pixel value is determined.

According to another embodiment of the present invention, there is provided a display image generating method. This display image generating method includes the steps of acquiring a movement velocity vector of a texture relative to a plane of a display image for each pixel in the display image, adjusting a reference range on the basis of the movement velocity vector, before sampling texel values in the reference range, determining a pixel value on the basis of the sampled texel values, and outputting data of the display image of which the pixel value is determined.

Incidentally, if other combinations of the above-outlined composing elements or the above expressions of the present invention are converted between different forms such as methods and apparatuses, they still constitute effective embodiments of the present invention.

Advantageous Effect of Invention

According to the present invention, display images are viewed stably and appropriately regardless of the resolution or the frame rate of the display apparatus in use.

BRIEF DESCRIPTION OF DRAWINGS

FIG. 11 is a view depicting qualitative changes of a reference range of the texture being narrowed in relation to a movement velocity in consideration of two-dimensional movements with the embodiment.

FIG. 15 is a view schematically depicting examples of sampling points and their distributions in relation to the size of the reference range in the embodiment.

FIG. 20 is a view depicting qualitatively how the resolution levels of the texture are switched in relation to the movement velocity in a mode in which the reference range of the texture is narrowed with respect to the movement velocity in consideration of two-dimensional movements with the embodiment.

DESCRIPTION OF EMBODIMENT

Figure 1:
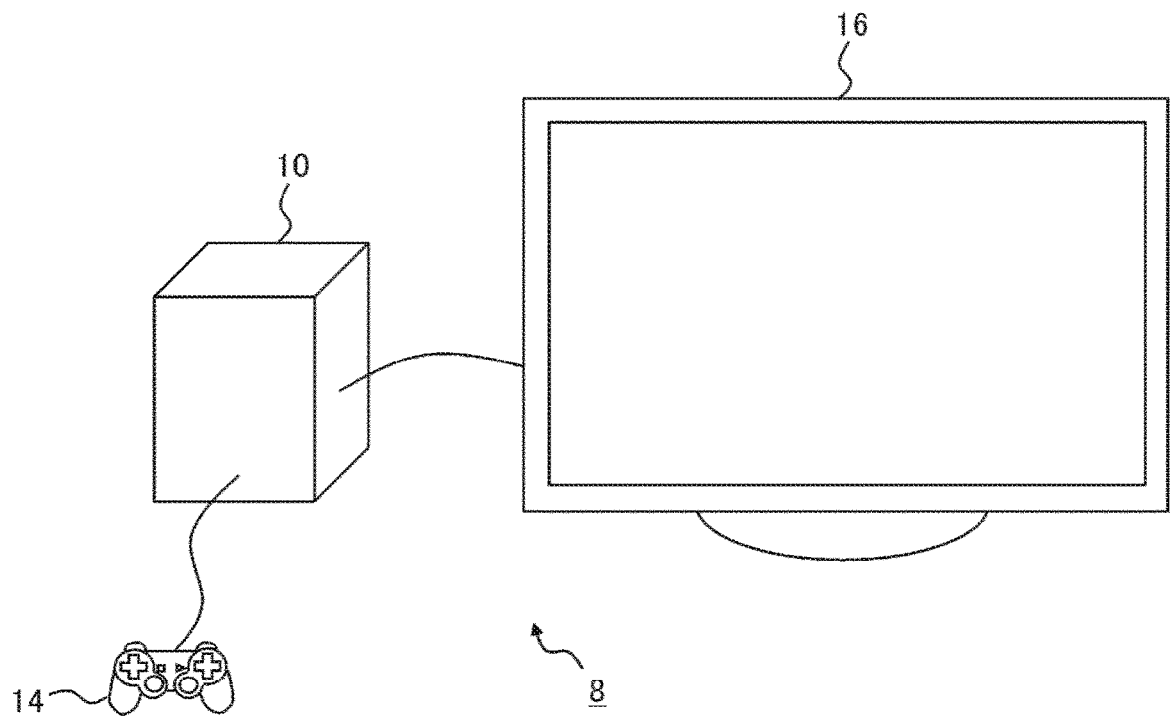
FIG. 1 is a view depicting a typical configuration of an image processing system to which an embodiment of the present disclosure may be applied.

FIG. 1 depicts a typical configuration of an image processing system to which an embodiment of the present disclosure may be applied. An image processing system 8 includes an input apparatus 14 operated by a user, an image processing apparatus 10 that generates display images in response to the user's operations, for example, and a display apparatus 16 that displays images.

The image processing apparatus 10, the input apparatus 14, and the display apparatus 16 may be interconnected by cable or by a known wireless communication technology such as Bluetooth (registered trademark). In addition, the appearances of these apparatuses are not limited to those illustrated in the drawing. Further, two or more of these apparatuses may be integrated into a single apparatus. For example, the image processing apparatus 10, the input apparatus 14, and the display apparatus 16 may be implemented in the form of a mobile terminal having the functions of these apparatuses. Also, the display apparatus 16 may be a head-mounted display device (hereinafter referred to as the "HMD") worn by the user on the head and presenting images before the user's eyes. The image processing apparatus 10 may be incorporated in the HMD.

The input apparatus 14 may be implemented as any one of or a combination of common input apparatuses such as a game controller, a keyboard, a mouse, a joystick, and a touch pad disposed on the display screen of the display apparatus 16. Alternatively, the input apparatus 14 may be a microphone through which sound is to be input or an imaging apparatus that captures the real space. The input apparatus 14 is operated by the user to accept requests such as those for starting and ending processing, selecting functions and content, and inputting various commands. The input apparatus 14 supplies the requests as electrical signals to the image processing apparatus 10.

The image processing apparatus 10 generates data of a display image in response to the user's operations or the like via the input apparatus 14 and outputs the generated data to the display apparatus 16. Here, the type of information to be presented as the display image is not limited to anything specific. The type of such information may suitably be determined according to the functions or the details of content desired by the user. For example, the information may be images with no movement such as electronic books, maps, webpages, and photos or images assumed to include movements such as the screens of electronic games. The information may alternatively be images of augmented reality in which virtual objects are superimposed on the image acquired by an imaging apparatus not depicted.

The display apparatus 16 may be a common apparatus that outputs images generated by the image processing apparatus 10. For example, the display apparatus 16 may be a liquid crystal display TV (Television) set, an organic EL (Electroluminescence) TV set, a plasma TV set, or a PC (Personal Computer) monitor. The display apparatus 16 may alternatively be the display unit of a tablet terminal or of a mobile terminal, an HMD, or a projector.

Figure 2:
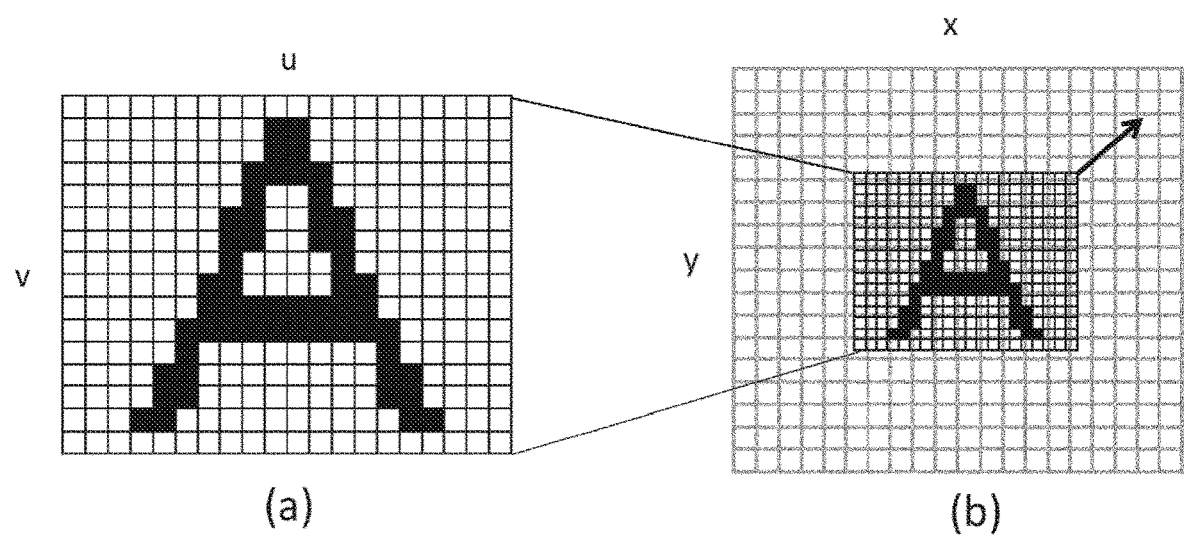
FIG. 2 is a view schematically depicting relations between an image displayed by the embodiment on one hand and pixels of a display apparatus on the other hand.

FIG. 2 schematically depicts relations between an image displayed with the embodiment on one hand and pixels of the display apparatus 16 on the other hand. Subfigure (a) in FIG. 2 depicts the region of a character "A" as part of an image of the display target. Subfigure (b) in FIG. 2 illustrates how the character "A" is displayed on the screen of the display apparatus 16. As depicted in subfigure (a), the image of the display target has a data structure in which a color is set for each of two-dimensionally arrayed pixels defined by (u, v) coordinates.

On the basis of the image of the display target generated beforehand as described above, the image processing apparatus 10 generates a display image having a resolution corresponding to that of the display apparatus 16 as depicted in subfigure (b). The image processing apparatus 10 determines the value of each pixel in the display image depicted in subfigure (b), using the value of each pixel in the image illustrated in subfigure (a). That is, the display image is generated in an x-y coordinate system independent of the u-v coordinate system of the display target image.

The above processing corresponds to texture mapping in computer graphics. Thus, the image of the display target such as one illustrated in subfigure (a) will be referred to as a "texture" hereunder. With the present embodiment, the images representing the information regarding the display target are prepared as texture data having a resolution higher than that at the time of their display on the display apparatus 16. As mentioned above, the types of the images expressed as textures are not limited to anything specific. The images may be constituted by characters or graphics or may represent object surfaces.

Figure 3:
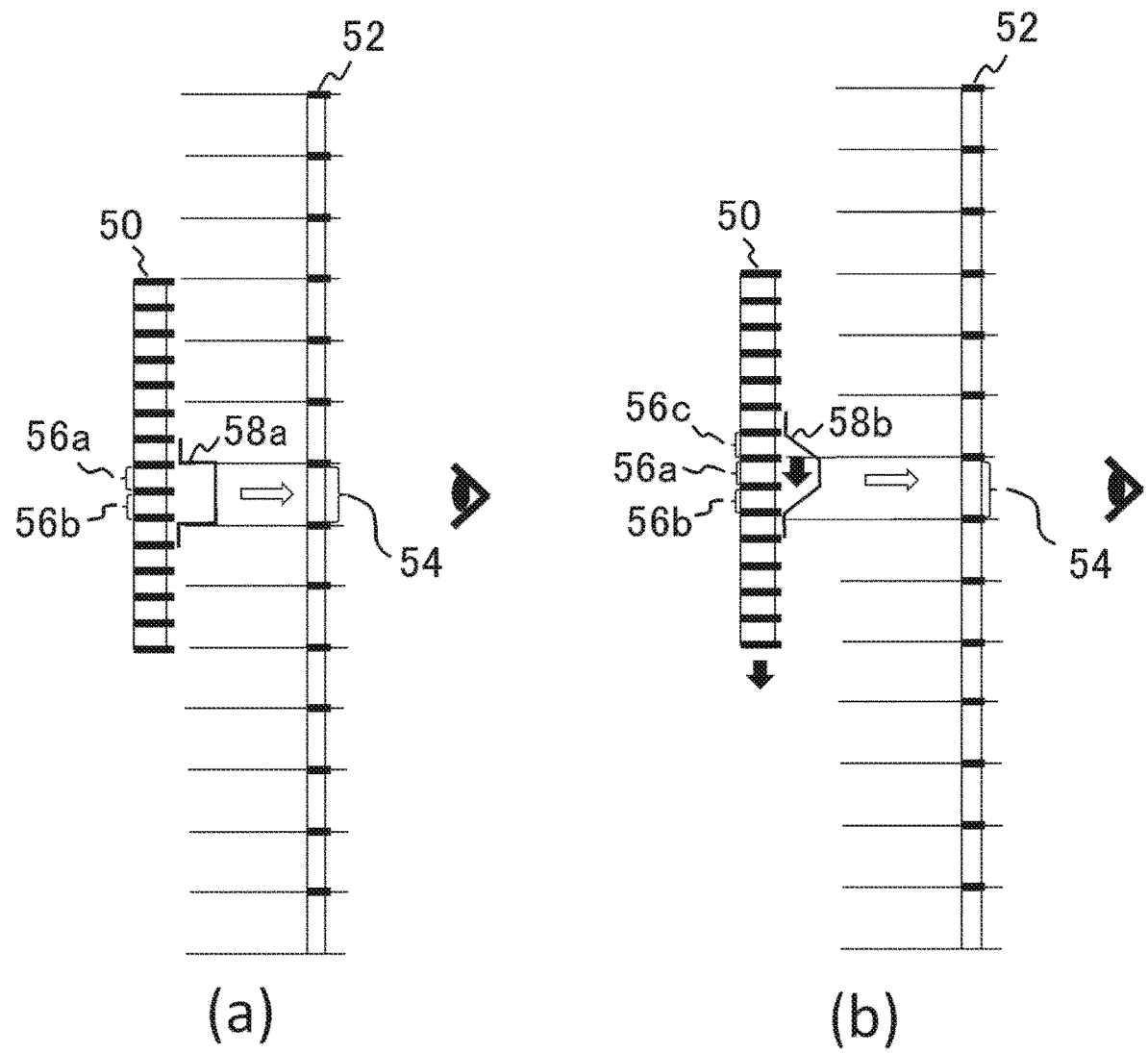
FIG. 3 is a view explaining a typical method of determining a pixel value of a display image using texels with the embodiment.

FIG. 3 is a view explaining a typical method of determining a pixel value of a display image using texture pixels (texels). In FIG. 3, subfigures (a) and (b) both schematically depict a texture 50 and a display image 52 as they are viewed from the side. In each side view, thick lines arranged an equal distance apart represent boundaries between pixels. In a case where the texels of the texture 50 are finer than the pixels of the display image 52, multiple texels correspond to each pixel in the display image 52. In this illustrated example, two texels 56*a* and 56*b* correspond to a pixel 54 in the display image 52.

If it is assumed here that the texels 56a and 56b respectively have values p1 and p2, the pixel value C of the pixel 54 in the display image 52 is determined as follows.

$$C=(p1+p2)/2$$

It is to be noted that the above equation relates only to one-dimensional pixels. In a case where 2×2 texels (=4 texels) correspond to the pixel 54 in two dimensions including the depth direction of the drawing, the pixel value is given as an average of the four texel values.

The above-described method of determining the pixel value is equivalent to reducing the texture in relation to the resolution of the display apparatus 16. On the other hand, in a case where the texture 50 is moved relative to the screen of the display apparatus 16, adding the values of adjacent texels helps create a visual effect regarding an object in movement. For example, in a case where the texture 50 is moved downward relative to the plane of the display image 52 as indicated by a black arrow in subfigure (b), the values p1 and p2 of the texels 56a and 56b currently corresponding to the pixel 54 are supplemented with a value p0 of a texel 156c coming successively into the relevant region, so that the pixel value C of the pixel 54 is determined as follows.

$$C=p0/4+p1/2+p2/4$$

That is, in the case where the texture 50 is moved, the range in which texels are read out from the texture (i.e., reference range) is extended along the axis of the direction of movement. Further, the farther the position away from the center toward the edge in the extended axial direction, the smaller the factor by which a weighted average of the texel values is obtained in order to acquire the pixel value. Such processing provides image representation in a manner similar to that when a moving object is actually viewed, as a slightly blurred image in the direction of movement. With the image changed smoothly between frames during movement of the display target, the processing also makes it possible to present the image favorably even at a frame rate lower than that appropriate for the resolution of the display apparatus.

Also in the above case, in practice, the texel values are referenced in two dimensions including the depth direction of the drawing in determining the pixel value. Incidentally, the movement of the texture occurs in three cases: the case where a plane onto which the texture is mapped is moved in the space of the display target, the case where the region of the texture mapped onto the plane is moved, and the case where the region and the plane are moved simultaneously. In the description that follows, these cases are generically referred to as a "texture movement."

Figure 4:
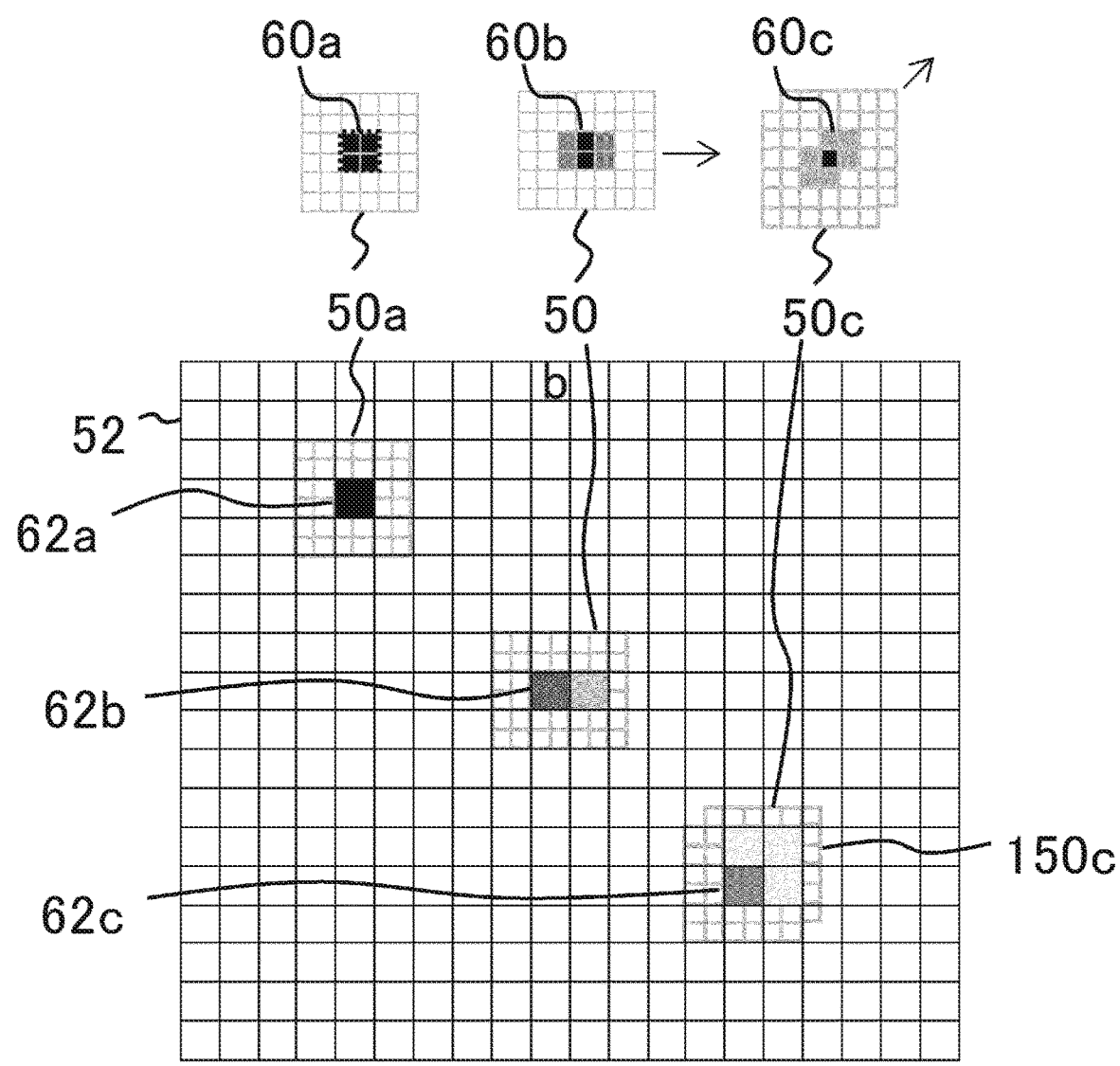
FIG. 4 is a view schematically depicting how a pixel value is determined in consideration of two-dimensional movements with the embodiment.

FIG. 4 schematically depicts how a pixel value is determined in consideration of two-dimensional movements. Here, one pixel in the display image 52 depicted in the lower part of the drawing is assumed to correspond to 2×2 (=4) texels among the texels depicted in the upper part of the drawing. The drawing illustrates how, in the display image 52, a pixel 62a appears in a case where a texture 50a is stationary; how a pixel 62b appears in a case where a texture 50b is moved rightward as indicated by an arrow; and how a pixel 62c appears in a case where a texture 50c is moved in the top right direction as indicated by another arrow.

In addition, the textures 50a, 50b, and 50c respectively indicate reference ranges 60a, 60b, and 60c, for determining the pixels 62a, 62b, and 62c in the display image 52. Further in the reference ranges 60a, 60b, and 60c, a weighting factor given to each texel is indicated on a gray scale with black representing the maximum value. First, in the case where the texture 50a is stationary, a region constituted by four texels corresponding to the pixel 62a is regarded as the reference range 60a. The texel values of the four texels are averaged with an equal weight on each value.

In the case where the texture 50b is moved rightward, the reference range is extended along the axis of the direction of movement as mentioned above. In this illustrated example, as a result of extension from two to three texels, a region constituted by 3×2 texels is regarded as the reference range 60b. At this time, the weight of the leading two pixels and that of the trailing two pixels in the direction of movement are reduced. In the case where the texture 50c is moved in the top right direction, the reference range is extended likewise along the axis of the direction of movement. In this illustrated example, as a result of adding leading (or trailing) three pixels, a region constituted by seven texels is regarded as the reference range 60c. At this time, the weight of the leading three pixels and that of the trailing three pixels are reduced.

When the pixel value is determined as described above, the pixels 62a, 62b, and 62c and their adjacent pixels in the display image 52 produce an image with smooth changes in the direction in which the movement occurs at a velocity, as illustrated. It is to be noted that in the foregoing examples, the pixel boundary of the texture 50 is assumed to coincide with the pixel boundary of the display image 52 for the purpose of simplification. Preferably, suitable window functions (58a and 58b in FIG. 3) or filters may be controlled as circumstances dictate so as to convolve texel values. This allows the pixel value to be determined in a similar manner regardless of where the texture 50 is positioned.

Figure 5:
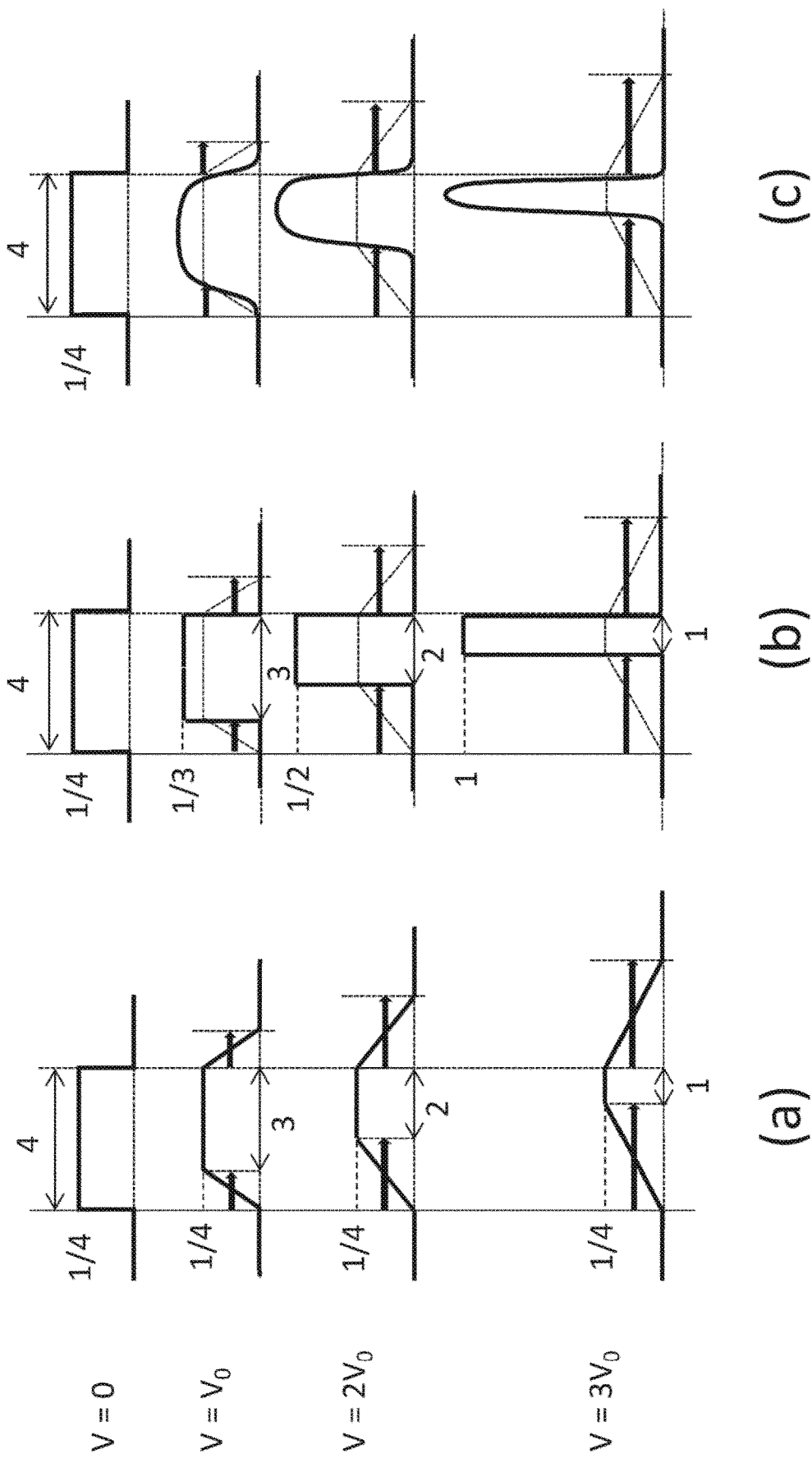
FIG. 5 is a view depicting typical changes of window functions with respect to the movement velocity of a texture with the embodiment.

FIG. 5 depicts typical changes of window functions with respect to the movement velocity of the texture. The window functions in this drawing are in one dimension, indicating crosswise or longitudinal positions of the texture on the horizontal axis. In practice, however, the window function is set in two dimensions. Also in this example, four texels in one dimension are assumed to correspond to one pixel in the display image. The top part in each of subfigures (a), (b) and (c) stands for the window function in a case where the texture is stationary, i.e., where velocity V=0. In this case, as depicted in subfigure (a) in FIG. 3, four texels corresponding to one pixel in the display image are regarded as the reference range. These texel values are each multiplied by an equal factor, i.e., ¼ in this case, and the products are added up to calculate the pixel value of the display image. Thus, the window function provides a rectangular window as illustrated.

The second, third, and fourth parts from above in subfigure (a) respectively depict typical window functions for the texture moving at velocities $V=V_0$, $2V_0$, and $3V_0$. As illustrated, the higher the velocity V is, the wider the reference range of the texture is extended qualitatively in the direction of movement. Here, if it is assumed that the texture is moved one texel per frame at the velocity $V_0$, the reference range is extended by the amount in which the texture is moved from the preceding frame in this illustrated example. Also, as mentioned above, the farther the texture is away from the center in the extended axial direction, the smaller the factor is made.

As a result, five texels in the reference range at the velocity $V_0$, for example, are given the following factors.

[⅛, ¼, ¼, ¼, ⅛] At the velocity $2V_0$, six texels in the reference range are given the following factors.

[1/16, 3/16, ¼, ¼, 3/16, 1/16] At the velocity $3V_0$, seven texels in the reference range are given the following factors.

[1/24, ⅛, 5/24, ¼, 5/24/, ⅛, 1/24]

Given the window factors such as those depicted in subfigure (a), the higher the velocity becomes, the fuzzier the image in the direction of movement becomes. The image is thus displayed in a manner similar to that when the object in movement is actually viewed. Further, even when the frame rate is low with respect to the resolution of the display apparatus, the discontinuities between frames in the direction of movement are suppressed.

On the other hand, in a case where the user is visually tracking the display target in movement (the activity is called "visual tracking" hereunder), the above-mentioned fuzziness may be inconvenient rather than convenient. That is, at a movement velocity at which visual tracking is possible, the image remains still on the retina, so that the image, which should originally be visible as a still image, is instead viewed as being fuzzy. In a case where the user intends to visually track the image in detail, the fuzziness marring the image can be stressful to the user. For example, when visually tracking the characters of an electronic book while scrolling its pages, the user may experience difficulty in reading or a sense of discomfort during the scroll due to the fuzziness of the characters.

In such a case, the reference range of the texture may be narrowed in relation to an increase in the movement velocity of the texture, as depicted in subfigures (b) and (c). For example, at the velocity $V_0$, the reference range is narrowed by one texel in the direction of movement, and the remaining three texels are given the following factors.

[⅓, ⅓, ⅓] At the velocity $2V_0$, the reference range is further narrowed by another texel, and the remaining two texels are given the following factors.

[½, ½] At the velocity $3V_0$, the reference range is narrowed still further by another texel, and the remaining one texel is given the following factor.

[1] That is, at the velocity $3V_0$, a single texel value of the reference part is used unmodified as the pixel value.

Humans have the visual capability of storing, adding up, and recognizing visual stimuli on the order of tens and hundreds of milliseconds. Thus, when the gaze position is moved by visual tracking, the colors of the pixels on the movement route are recognized by being added up. For this reason, the reference range of the texture is deliberately narrowed with respect to the increase in the movement velocity in order to reduce the degree of spatial composition in the display image of each frame. This enables perception of a clearer image. In addition, under such control, the load of reading out the texture and performing calculations is alleviated.

In the case where the reference range is narrowed by the amount in which the texture is moved from the preceding frame as illustrated, there is no failure if the upper limit on the movement velocity to which the above control is applied is set to an amount corresponding to one pixel per frame (four texels of the texture in this illustrated example). Conversely, at a movement velocity higher than the upper limit, the need for presenting the image in detail may presumably be reduced. In such a case, the reference range may therefore be extended in relation to the increase in the movement velocity as in the case of subfigure (a). It is to be noted that the window functions depicted in subfigure (b) as well as the above-mentioned factors are only examples. If, for example, the window function is defined by use of curves as in subfigure (c), the window function can be applied regardless of the texel position or the relations in size between the texels and the pixel in the display image.

Figure 6:
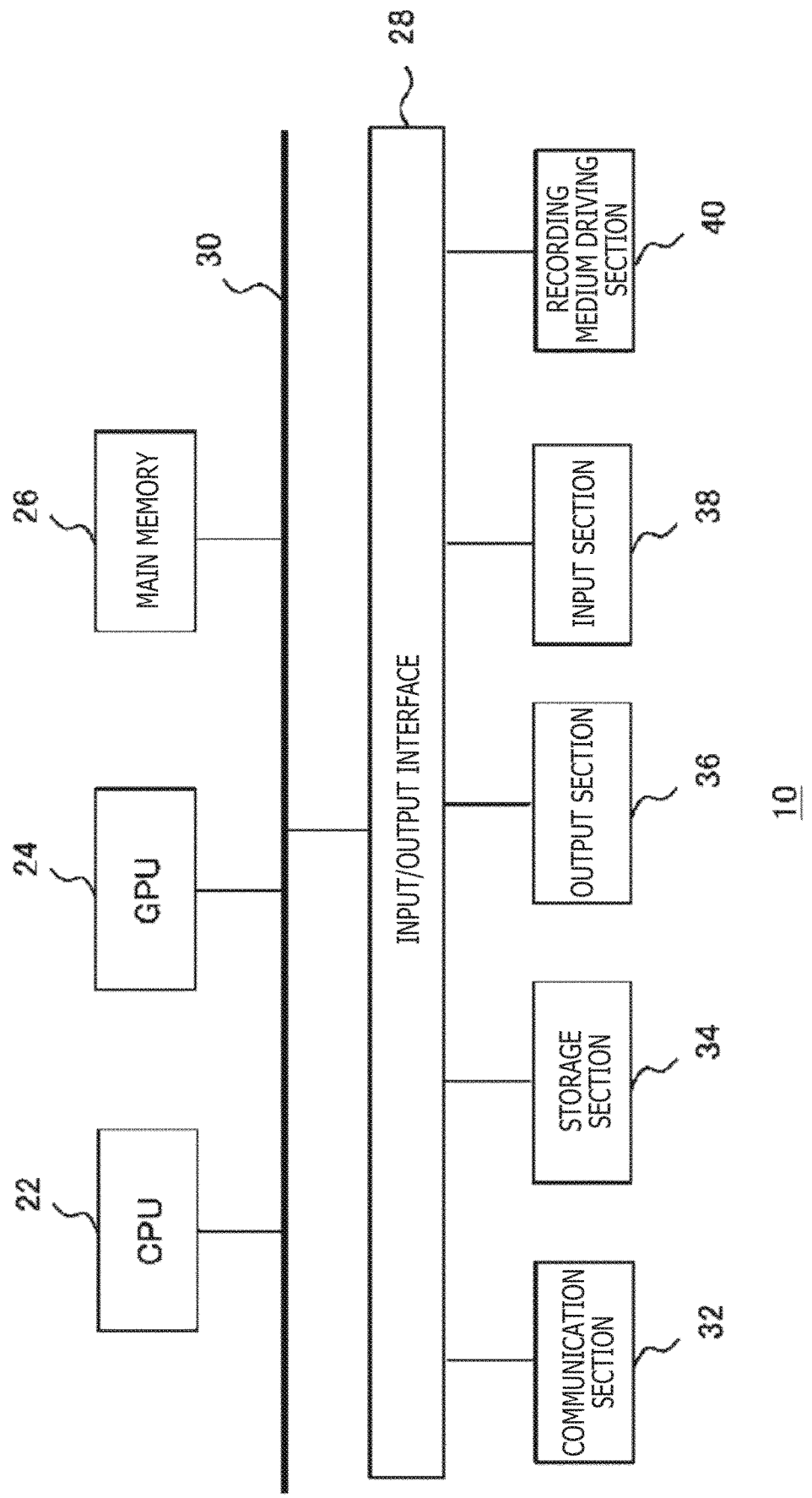
FIG. 6 is a view depicting an internal circuit configuration of an image processing apparatus of the embodiment.

FIG. 6 depicts an internal circuit configuration of the image processing apparatus 10. The image processing apparatus 10 includes a CPU (Central Processing Unit) 22, a GPU (Graphics Processing Unit) 24, and a main memory 26. These components are interconnected via a bus 30. The bus 30 is further connected with an input/output interface 28. The input/output interface 28 is connected with a communication section 32, a storage section 34, an output section 36, an input section 38, and a recording medium driving section 40. The communication section 32 includes a peripheral interface such as a USB or IEEE 1394 interface and a wired or wireless LAN interface. The storage section 34 includes a hard disk drive and/or a nonvolatile memory, for example. The output section 36 outputs data to the display apparatus 16. The input section 38 receives input of data from the input apparatus 14. The recording medium driving section 40 drives removable recording media such as magnetic disks, optical disks, or semiconductor memories.

The CPU 22 controls the entire image processing apparatus 10 by executing an operating system stored in the storage section 34. Further, the CPU 22 carries out various programs read out from removable recording media and loaded into the main memory 26 or downloaded via the communication section 32. The GPU 24 has the functions of a geometry engine and a rendering processor. The GPU 24 performs rendering processes in accordance with rendering instructions from the CPU 22 and stores the resulting display image into an unillustrated frame buffer. Further, the GPU 24 converts the display image stored in the frame buffer into a video signal before outputting the video signal to the output section 36. The main memory 26 is constituted by a RAM (random access memory) that stores programs and data necessary for the processing.

Figure 7:
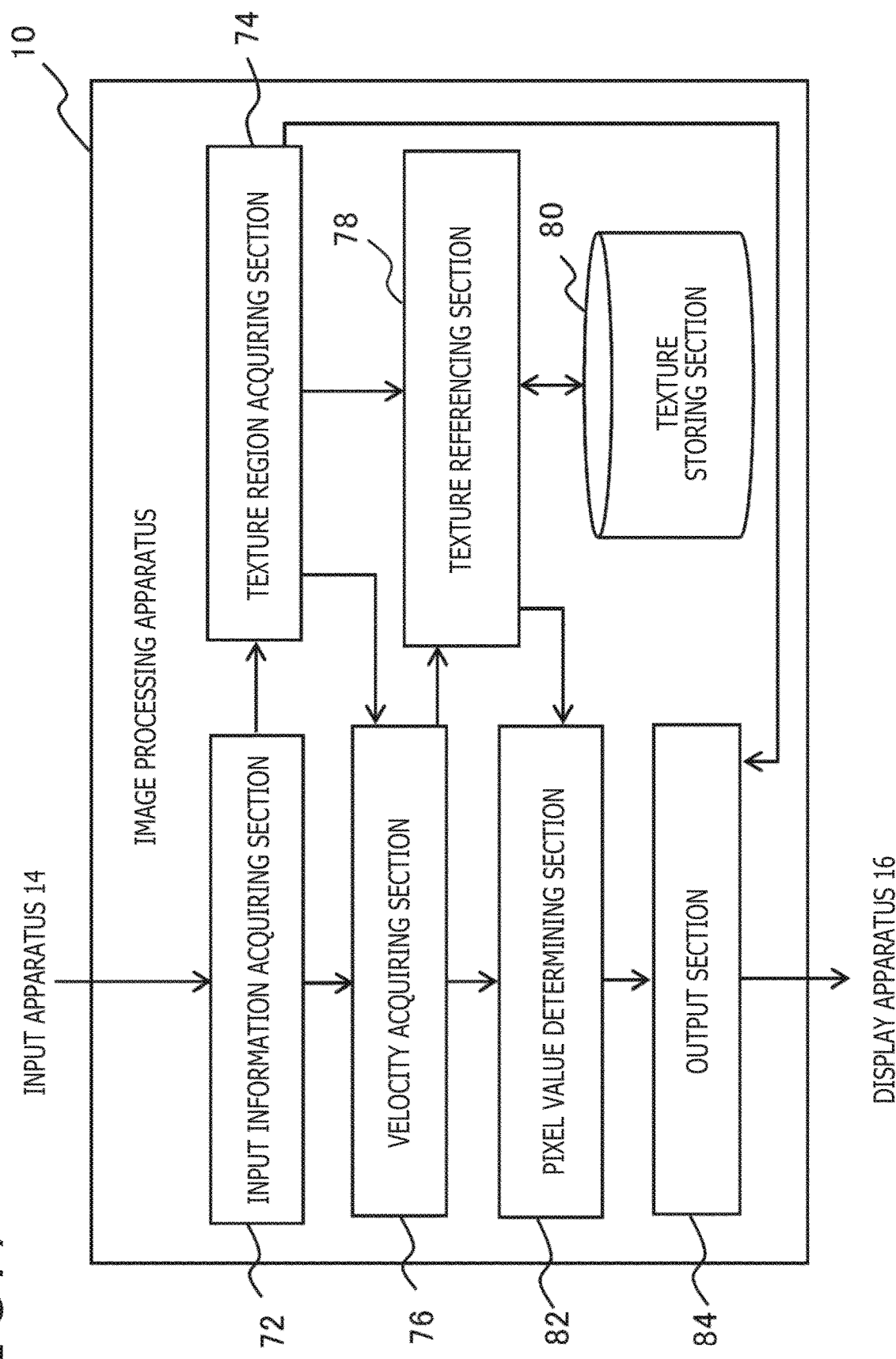
FIG. 7 is a view depicting a functional block configuration of the image processing apparatus of the embodiment.

FIG. 7 depicts a functional block configuration of the image processing apparatus 10 of the embodiment. The functional blocks in FIG. 7 are implemented in hardware using the CPU 22, GPU 24, main memory 26, output section 36, and input section 38 indicated in FIG. 6 or implemented in software using programs that are loaded from a recording medium into the main memory 26 to realize such functions as data input, data retention, calculation, image processing, and communication. Thus, it will be understood by those skilled in the art that these functions are implemented by hardware alone, by software alone, or by diverse combinations of these resources and are not limited to any specific one of such resources.

The image processing apparatus 10 includes an input information acquiring section 72 that acquires input information from the input apparatus 14, a texture region acquiring section 74 that acquires from a display image a region representing a texture, a velocity acquiring section 76 that acquires the movement velocity of the texture, a texture referencing section 78 that references the texture in a range corresponding to the velocity, a texture storing section 80 that stores the data of the texture, a pixel value determining section 82 that determines a pixel value of the display image on the basis of texel values read out, and an output section 84 that outputs the data of the display image to the display apparatus 16.

The input information acquiring section 72, implemented using the input section 38 and CPU 22 in FIG. 6, acquires the details of user's operations from the input apparatus 14. Here, the user's operations may be related to common information processing such as selection of information processing details to be executed, selection of a display target, start and end of the processing, and input of commands with regard to the currently executed information processing. The input information acquiring section 72 supplies the acquired details of the user's operations to the texture region acquiring section 74 and to the velocity acquiring section 76 as needed.

The texture region acquiring section 74, implemented using the CPU 22 and main memory 26 in FIG. 6, determines a configuration of the display image on the basis of the details of the user's operations. At this time, the region representing the texture is acquired from the plane of the display image. At the same time, the texture region acquiring section 74 notifies the velocity acquiring section 76 and the texture referencing section 78 of the acquired region in association with identification information identifying the texture. There exist diverse methods of acquiring the region representing the texture depending on the details of the image to be displayed and the type of information involved. For example, the data regarding a predetermined region on the plane of the display image may simply be read out from, for example, the main memory 26. Alternatively, the region may be acquired by projecting a virtual object to be expressed using the texture onto a screen established on the basis of a point of view with respect to a virtual world.

Preferably, the texture region acquiring section 74 may change the configuration of the display image in response to the user's operations or in accordance with predetermined rules. For example, in a mode where a game screen is generated as a result of an electronic game, the texture region acquiring section 74 may perform game-related processes as well. In a case where the region representing the texture needs to be moved as a result of changing the configuration of the display image, the texture region acquiring section 74 notifies the velocity acquiring section 76 of information to that effect as needed.

The velocity acquiring section 76, implemented using the CPU 22, GPU 24, and main memory 26 in FIG. 6, acquires the velocity of movement of the texture relative to the plane of the display image with respect to each pixel in the display image. The texture may be moved by the user's operation or by means of a predetermined program. Whatever the means adopted, there are three cases to be addressed: the case where the region representing the texture is to be moved on the plane of the display image, the case where an image of the texture is to be moved within the region, and the case where both the texture region and the texture image are to be moved. In the case where the region representing the texture is to be moved, the information regarding the movement is acquired from the texture region acquiring section 74.

In the case where the texture image is to be moved within the region, e.g., where a scroll or scaling is to be performed, the details of the user's operations involved are acquired from the input information acquiring section 72, or relevant settings stored beforehand in the main memory 26 are read out therefrom. The texture storing section 80, constituted, for example, by the storage section 34 and main memory 26 in FIG. 6, stores texture data. The present embodiment, as mentioned above, has textures prepared at higher resolution levels than the resolution of the screen of the display apparatus 16. Alternatively, the texture data may be prepared at multiple resolution levels, as will be discussed later.

By use of a texture of which the region of one texel is smaller than the region of one pixel upon display, the convolution depicted in FIGS. 3 to 5 is implemented. On the other hand, using a texture at a resolution level excessively higher than that of the display image increases the load of reading out and calculating texel values. Thus, in a mode where the texture is scaled and the size of the region on the texture corresponding to one pixel in the display image is changed, pieces of texture data at multiple resolution levels are prepared so as to let the resolution be selected adaptively.

Preferably, a high-resolution texture may be used to narrow the reference range in relation to the increase in the movement velocity, as will be discussed later.

The texture referencing section 78, implemented using the CPU 22, GPU 24, and main memory 26 in FIG. 6, determines the reference range of the texture for each pixel in the display image. The texture referencing section 78 further determines a distribution of sampling points and reads out the corresponding texel values from the texture storing section 80. At this time, the reference range is changed in keeping with the velocity of movement of the texture with respect to the plane of the display image as discussed above. Because different advantageous effects are obtained from two cases, one in which the reference range is extended with respect to the increasing velocity and the other in which the reference range is narrowed in relation to the increasing velocity as discussed above with reference to FIG. 5, the reference range may suitably be changed depending on the movement velocity and the state of visual tracking.

The pixel value determining section 82, implemented using the CPU 22, GPU 24, and main memory 26 in FIG. 6, calculates texel values read out, to determine a pixel value of the display image. That is, as discussed above with reference to FIG. 5, the texel values are convolved by use of a window function determined by the movement velocity. Thus, the equations and matrices for defining window functions at multiple movement velocities are set beforehand for two cases: the case where the reference range is extended in keeping with the movement velocity and the case where the reference range is narrowed in relation to the movement velocity.

The output section 84, implemented using the CPU 22, GPU 24, main memory 26, and output section 36 in FIG. 6, outputs to the display apparatus 16 the display image of which all pixel values have been determined as described above. In a case where regions other than the region to be expressed by the texture are included in the display image, the output section 84 acquires information regarding these regions from the texture region acquiring section 74 and renders images of these regions separately before outputting the images.

Figure 8:
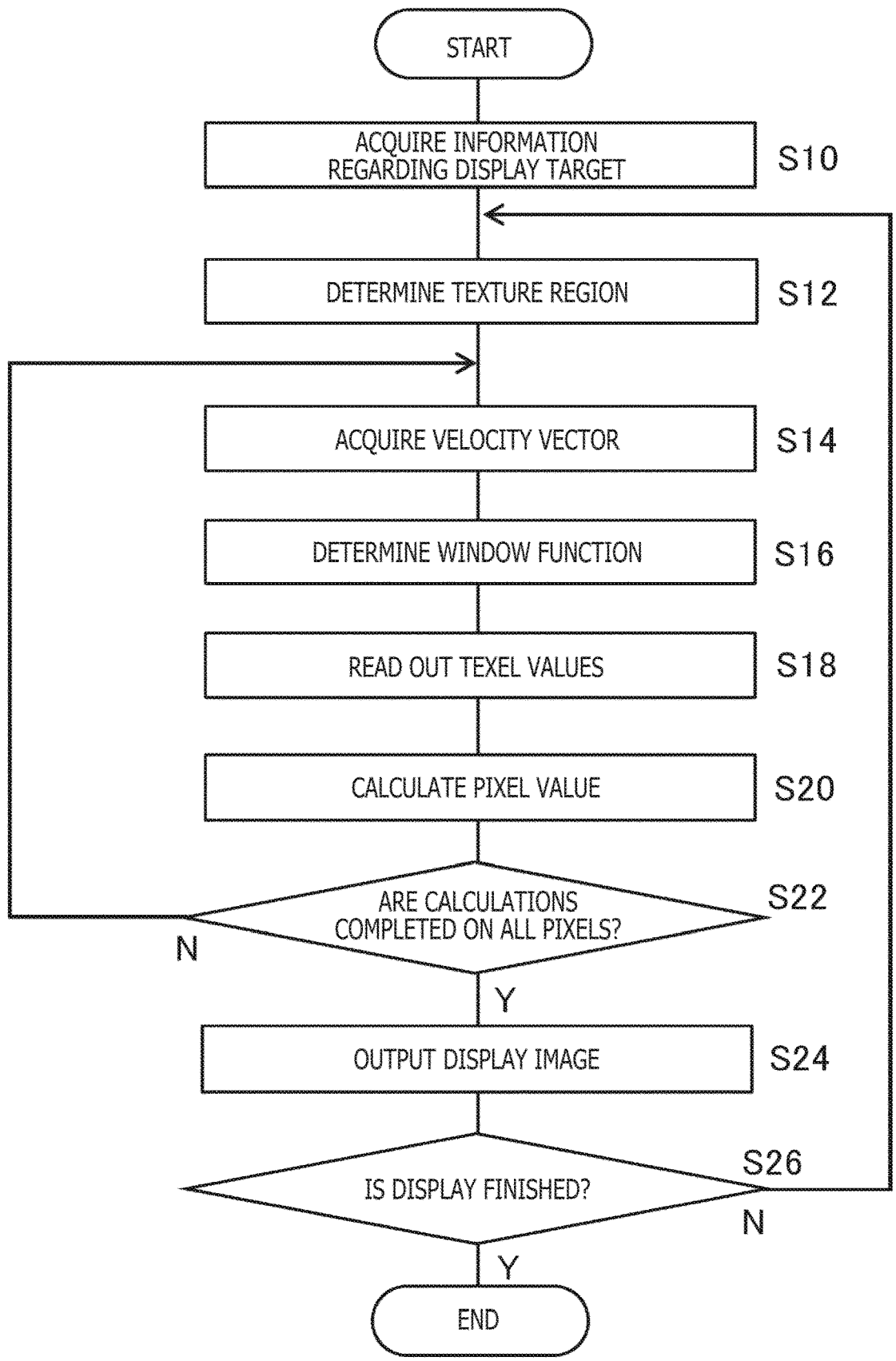
FIG. 8 is a flowchart depicting processing steps in which the image processing apparatus of the embodiment generates and outputs a display image to which a texture movement is added.

Explained below are the operations of the image processing apparatus 10 implemented by use of the above-described configuration. FIG. 8 is a flowchart depicting processing steps in which the image processing apparatus 10 of the present embodiment generates and outputs a display image to which a texture movement is added. First, the texture region acquiring section 74 in the image processing apparatus 10 acquires information regarding the display target such as the content and information to be displayed, on the basis of the operations performed by the user on the input apparatus 14 (S10).

The texture region acquiring section 74 then determines the region to be expressed by the texture in the display image (texture region) in response to the user's operations or in accordance with predetermined rules (S12). Then, the velocity acquiring section 74 acquires a velocity vector representing the magnitude and direction of the movement velocity of the texture for each pixel in the texture region in response the user's operations or in accordance with predetermined rules (S14). For example, in a case where a document is scrolled or where the texture region is parallelly displaced, the same velocity vector applies to all pixels within the texture region.

In a case where the magnification of display is changed, the velocity vector is radial such that the velocity is zero at the center of scaling and that the farther the position away from the center, the higher the velocity. In addition, in a mode in which the display target is viewed from a free viewpoint, the distribution of velocity vectors is changed depending on the angle of the line of sight relative to the plane of the display target. The velocity acquiring section 76 identifies where the position in the texture corresponding to the target pixel in the current frame was located in the preceding frame, for example, and obtains the velocity vector of the texture on the basis of the difference between the two positions. For that purpose, the velocity acquiring section 76 is furnished with a buffer memory in which the position coordinates of the display image in at least the preceding frame are stored in association with the position coordinates of the texture.

Next, the texture referencing section 78 determines a suitable window function on the basis of the velocity vector (S16) and reads out the texel values from inside the reference range out of the texture data stored in the texture storing section 80 (S18). Preferably, before the determination of the window function, the texture referencing section 78 may determine whether to extend or to narrow the reference range with respect to an increase in the movement velocity in accordance with predetermined criteria such as the velocity of movement and the state of visual tracking. Also, in step S18, the texture referencing section 78 may select a texture at an appropriate resolution level on the basis of the size of the texels relative to one pixel in the display image and the velocity of movement of the texture, for example.

The pixel value determining section 82 then calculates the pixel value of the target pixel by performing convolution using the texels read out and the window function (S20). If the pixel values are not determined yet on all pixels in the texture region (N in S22), the processes of steps S14 to S20 are repeated on the next pixel in a raster sequence, for example. When all pixel values are determined in the texture region (Y in S22), the output section 84 completes the display image by suitably rendering images of regions other than the texture region and outputs the data of the display image to the display apparatus 16 in a suitably timed manner (S24). During a period in which display is not required to be finished by, for example, the user's operations (N in S26), the processes of steps S12 to S24 are repeated. The whole processing is terminated at the time when the display is finished (Y in S26).

Figure 9:
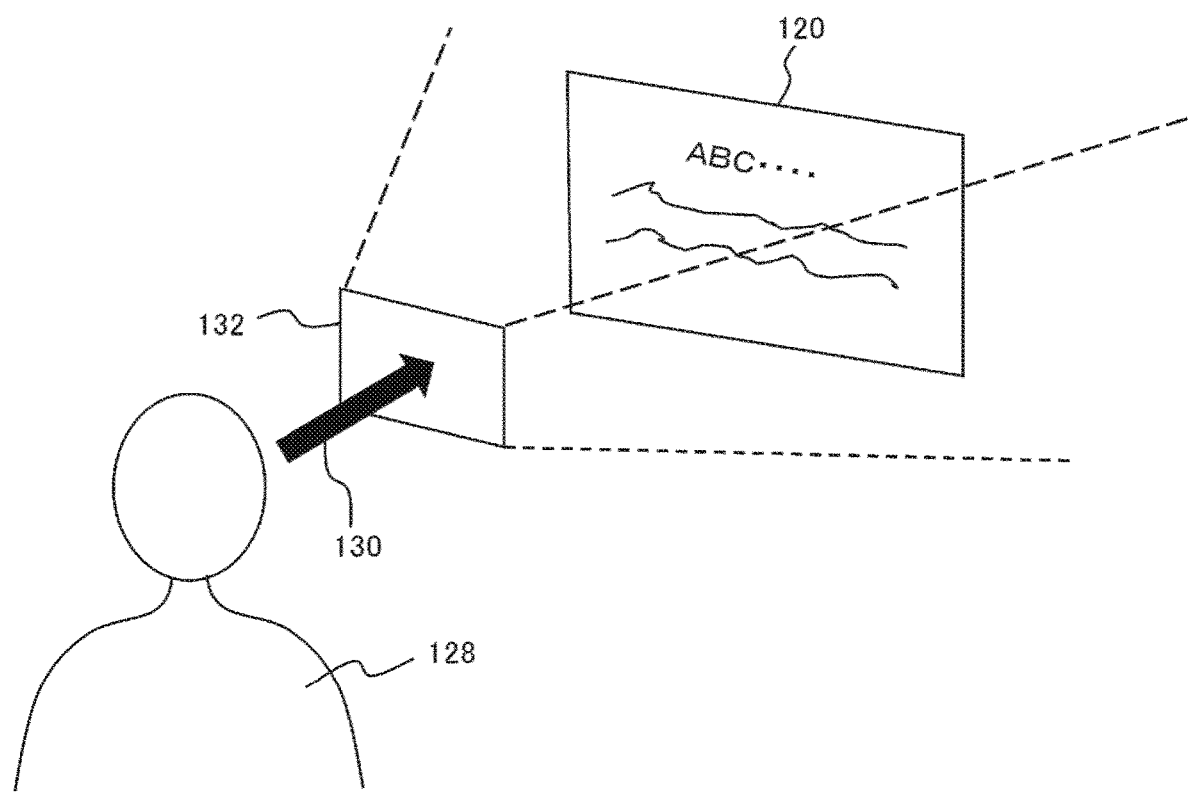
FIG. 9 is a view depicting a typical form of display on an HMD serving as a display apparatus of the embodiment.

Described below in detail is an embodiment to which the above-described configuration is applied and in which the display apparatus 16 is an HMD, with the display target being viewed from a free viewpoint. FIG. 9 is a view depicting a typical form of display on the HMD serving as the display apparatus of the embodiment. In this example, a user 128 creates a situation where a display target 120 in a virtual space is viewed from a free viewpoint. What is presented on the image of the display target 120 is texture data representing documents, for example.

At this time, the texture region acquiring section 74 forms a texture region by projecting four corners of a plane constituting the display target 120 onto a screen 132 established in relation to the position of the user 128 and the direction of a line of sight 130. The texture referencing section 78 then reads out texel values by obtaining the coordinates of the position on the texture corresponding to the pixel position in the texture region. The pixel value determining section 82 determines the pixel value of the display image using the texel values thus read out.

In the case where the HMD is introduced, the position and the line of sight 130 of the user 128 are estimated from the position and posture of the user's head based on measurements from a motion sensor disposed inside the HMD. Alternatively, the position and posture of the head may be obtained by use of an unillustrated camera for capturing images of markers of a predetermined shape disposed on the external surface of the HMD and by analyzing the captured images. As another alternative, the HMD may be equipped with a camera for capturing the environment to create an environmental map from which the position and posture of the head are obtained.

There exist various practical techniques for identifying the position and the line of sight of the user wearing the HMD. Any of these techniques may be applied to the present embodiment. In this case, the data of external sensor values and the data of captured images are acquired by the input information acquiring section 72 at a predetermined rate and analyzed by the texture region acquiring section 74.

The user moves the region to be displayed of the display target 120 by changing the face orientation or moving in front-back and left-right directions while viewing the display image representing the display target 120. In addition, a point of gaze on the display image is acquired by having an unillustrated point-of-gaze detector disposed in the HMD. There are well-known techniques for detecting the point of gaze on the screen by sensing, for example, a reflection of infrared rays emitted to the eyeballs. Incidentally, the operations such as parallel displacement and scaling of the display region and the movement of the viewpoint relative to the display target in a virtual space are implemented using the input apparatus 14 on the image displayed on a flat-screen display as well. In this respect, the techniques to be discussed below are not limited to the HMD.

Figure 10:
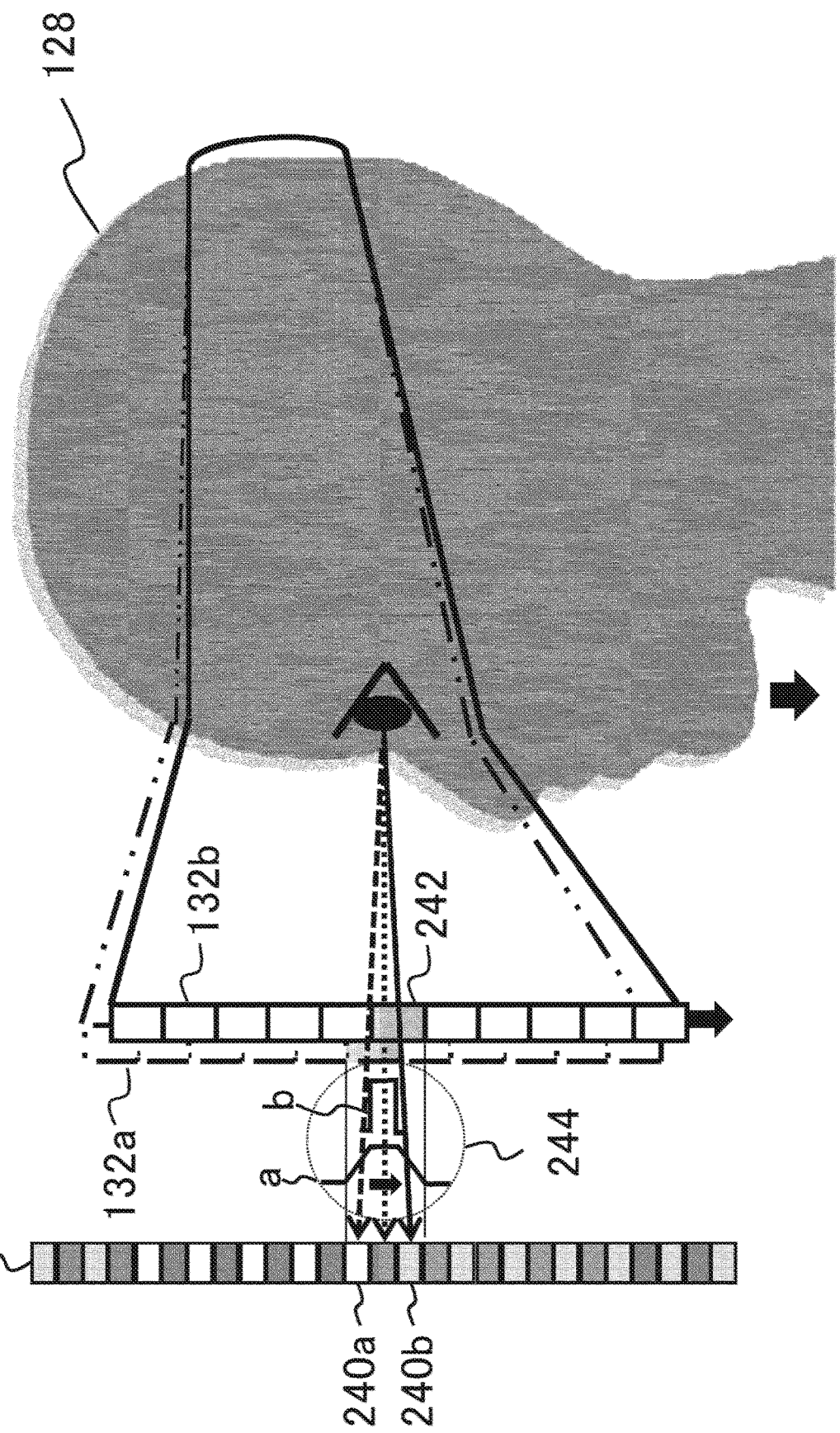
FIG. 10 is a view schematically depicting relations between a screen representing the display screen of the HMD of the embodiment on one hand and a pixel of the texture presented on the display target on the other hand.

FIG. 10 schematically depicts relations between the screen 132 corresponding to the display screen of the HMD on one hand and a pixel of a texture 134 presented on the display target 120 on the other hand. This drawing illustrates a virtual space, as viewed from the side, in which the user 128 and the display target 120 exist together. In this setup, even with the display target 120 held stationary, the texture 134 is moved relative to the screen 132 due to the head of the user 128 being moved.

For example, suppose that a screen 132*a* is moved to the position of a screen 132*b* while the user 128 is looking downward, a position on the texture 134 projected onto a shaded pixel 242 on the screens 132*a* and 132*b* is moved from a texel 240*a* to a texel 240*b*. Thus during a very short time period in which the movement takes place, the pixel 242 is made to correspond approximately to three texels 240*a* to 240*b*. In that case, approximately three texels are convolved using a window function "a" to determine the pixel value, as depicted schematically inside a circle 244. This causes colors to be blended in the direction of velocity, resulting in the presentation of an image similar to the object in movement actually being viewed.

Alternatively, a window function "b" may be used to determine the pixel value from a narrow range of texels such as a range of one texel. This allows a visually tracked image to be perceived with less fuzziness as in the case of still images. Preferably, the reference range may be narrowed in relation to the increasing velocity so as to reinforce the effect of cancelling the fuzziness that is likely to be perceived visually. This provides stable visual perception of high-definition images.

FIG. 11 depicts qualitative changes of a texture reference range being narrowed in relation to the movement velocity in consideration of two-dimensional movements. In this drawing, a 4×4 texel block is assumed to be projected onto one pixel in the display image. A circle or an ellipse in each block specifies the reference range at the time of relative movement of the texture with a velocity vector indicated by an arrow. It is to be noted that the circle or ellipse represents conceptually the texture reference range for use in determining the pixel value. In practice, discrete sampling points such as those indicated by black circles are determined depending on the range.

First, when the velocity of the texture relative to the screen is zero, a range of texels at equal distances from the block center is referenced as indicated in a block 250a by a circle. In a case where the texture is moved crosswise relative to the screen, i.e., where the velocity vector is (Vx, 0), the reference range is made narrower crosswise the higher the velocity Vx becomes, as indicated in blocks 250b and 250c by ellipses. In a case where the texture is moved longitudinally relative to the screen, i.e., where the velocity vector is (0, Vy), the reference range is made narrower longitudinally the higher the velocity Vy becomes, as indicated in blocks 250d and 250e by ellipses.

In a case where the texture is moved diagonally relative to the screen, i.e., where the velocity vector is (Vx, Vy), the reference range is made narrower in the same direction as the velocity vector, the higher the velocity $(Vx^2+Vy^2)^{1/2}$ becomes, as indicated in blocks 250f, 250g, 250h, and 250i by ellipses. It should be noted that if the reference range is narrowed in relation to the increase in the movement velocity, the relation between the reference range and the velocity is not specifically limited. For example, the relation may be defined by inverse proportion, by a linear function, or by an exponential function.

Figure 12:
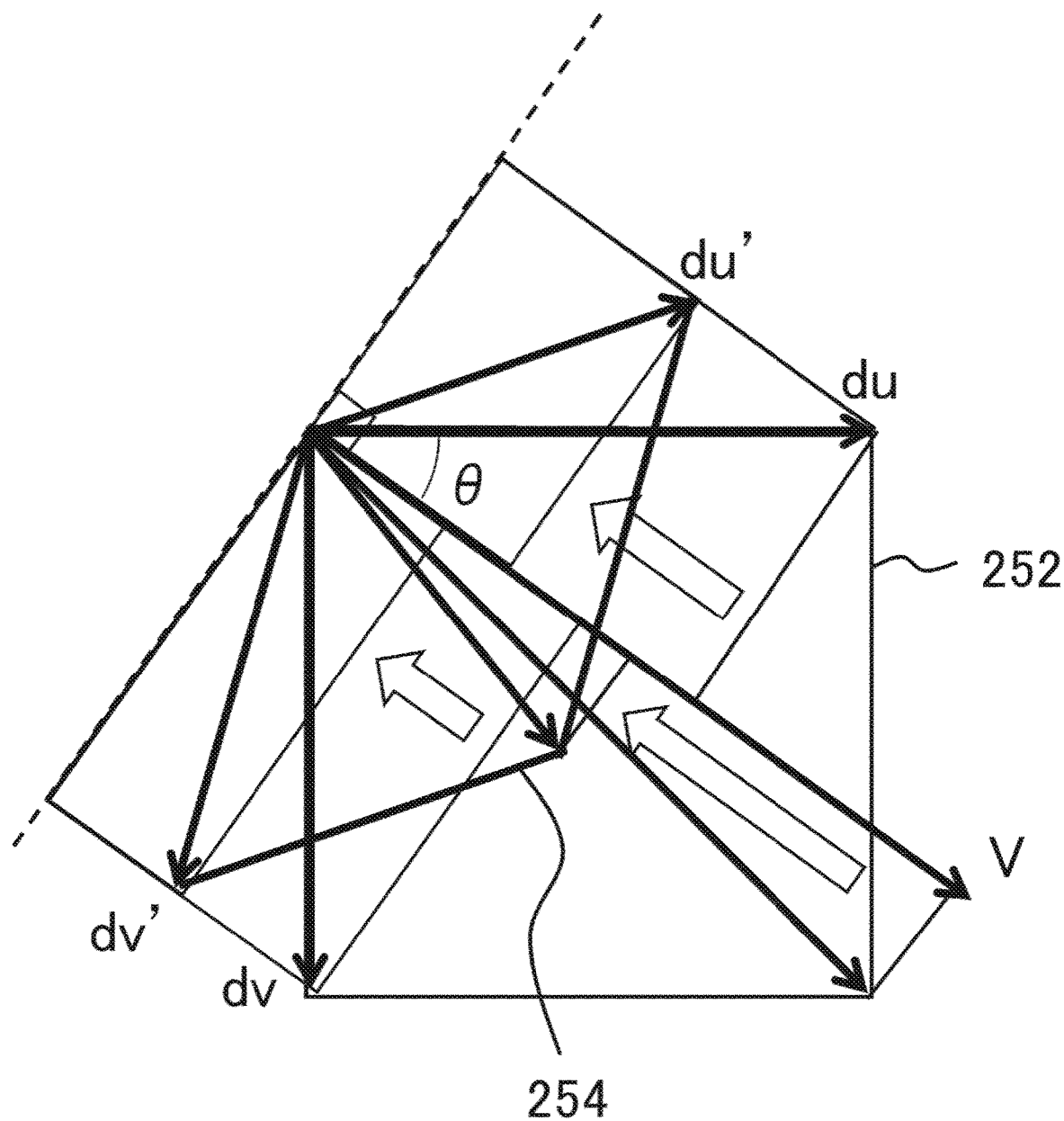
FIG. 12 is a view explaining a typical method of calculating the reference range of the texture being narrowed in relation to an increase in the movement velocity with the embodiment.

FIG. 12 is a view explaining a typical method of calculating the reference range of the texture being narrowed in relation to an increase in the movement velocity. First, the sides of a rectangular region 252 on the texture corresponding to one pixel in the display image are assumed to be represented by vectors du and dv. The rectangular region 252 corresponds to the block 250a in FIG. 11, among others.

As depicted in FIG. 11, when the texture of the pixel in the display image is moved in the direction of a velocity vector V, the rectangular region 252 is narrowed in the direction of that velocity vector V. Specifically, the vectors du and dv are separated into a component in the direction of the velocity vector V and a component in a direction perpendicular to the velocity vector direction. The component in the direction of the velocity vector V is multiplied by a reduction rate m (0<m<1) that causes a reduction with respect to an increasing velocity IVI. In addition, the product is combined with the component in the direction perpendicular to the velocity vector direction to obtain vectors du' and dv'. The vectors du' and dv' are used as the sides of a rectangular region 254 constituting a new reference range.

If the angle between the vector du and the velocity vector V is assumed to be θ, the vectors du' and dv' are obtained as follows.

$$du'=m \cdot du \cdot \cos \theta + du \cdot \sin \theta$$

$$dv'=m \cdot dv \cdot \sin \theta + dv \cdot \cos \theta$$

The trigonometric function of the angle θ is obtained, for example, from an inner product between the velocity vector V and the vector du. It should be noted that in FIG. 12, with the reduction rate being assumed to be m=0.5, the direction of reduction is indicated by hollow arrows. Setting the rate "m" to a value larger than one extends the reference range by similar calculations with respect to the increasing velocity.

When the above-described calculations are performed on each pixel in the display image to determine sampling points in such a manner that they are distributed over the entire reference range obtained, the pixel value reflecting the reference range is determined. With the present embodiment, the region corresponding to one pixel in the display image is defined on the texture plane. The region is then deformed by the method illustrated in the drawing to determine the position coordinates of sampling points. Thereafter, a common pixel shader is used to read out pixel values efficiently.

Figure 13:
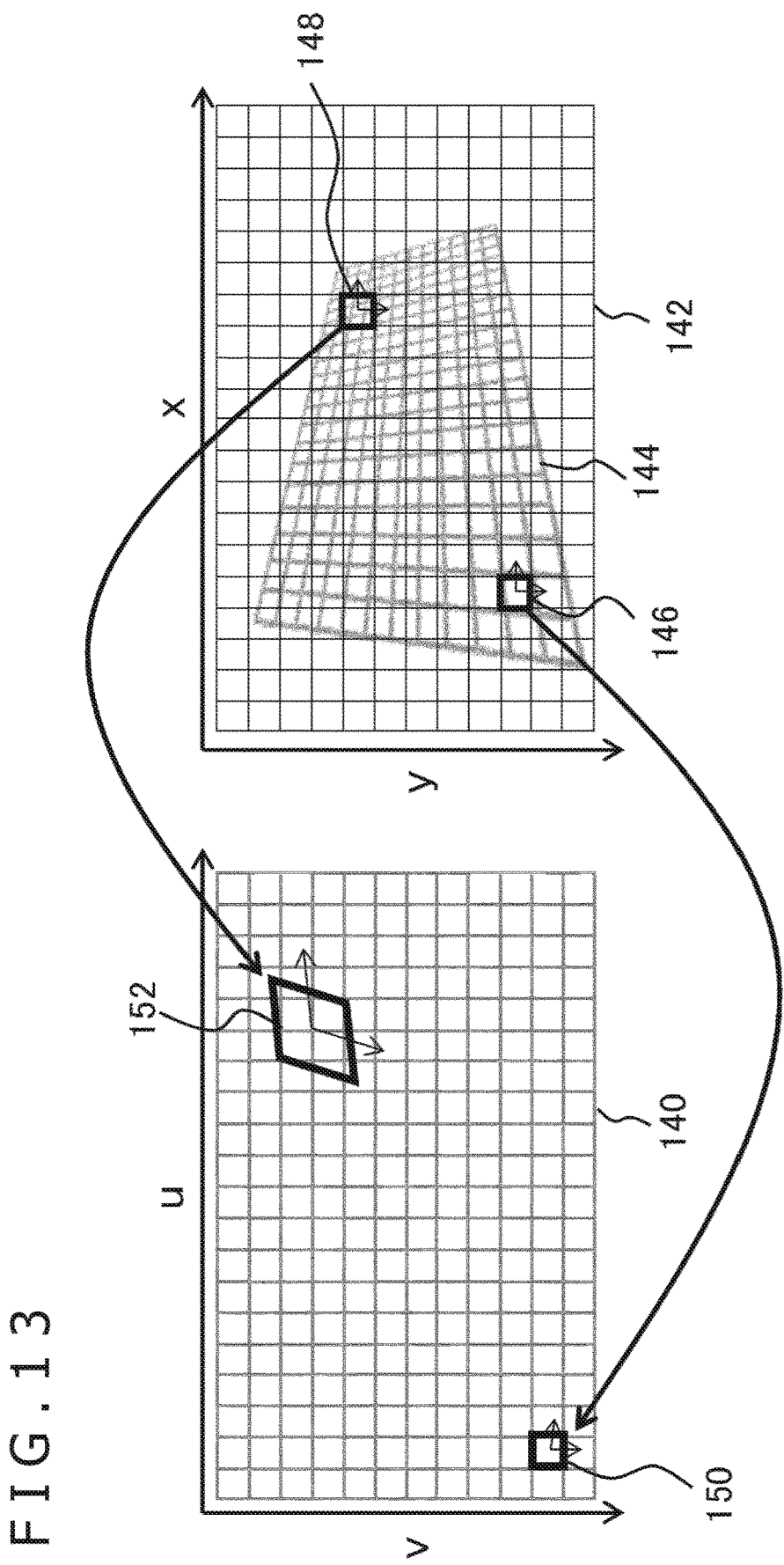
FIG. 13 is a view explaining corresponding relations between a region on a display image plane on one hand and a region on a texture plane on the other hand with the embodiment.

FIG. 13 is a view explaining corresponding relations between a region on a display image plane on one hand and a region on a texture plane on the other hand. In FIG. 13, a texture plane 140 is on the left and a display image plane 142 is on the right. On both planes, each of the minimum unit squares making up a grid-like pattern stands for a pixel. In the examples in FIGS. 11 and 12, the plane of the display target on which the texture is mapped (called a "mapping target plane" hereunder) is assumed to be in parallel with the display image plane for the purpose of simplification. FIG. 13, by contrast, indicates a state in which a mapping target plane and the display image plane are not in parallel with each other.

For that reason, the apparent texel region is not a square. Still, the method illustrated in FIG. 12 can be used to obtain the reference range with respect to velocity. In the case where a mapping target plane 144 is not in parallel with the display image plane 142 as described above, the number of texels corresponding to one pixel varies depending on the position on the display image plane 142. For example, whereas a pixel 146 corresponds approximately to one texel, a pixel 148 corresponds to at least four texels. The regions of texture images included in the pixels 146 and 148 on the display image plane 142 are approximated by regions 150 and 152, respectively, on the texture plane 140.

The mapping target plane 144 constitutes an image formed by projecting the display target 120 in the setup of FIG. 9 onto the screen 132. Thus, common coordinate transformation techniques may be used to identify where the position coordinates on the mapping target plane 144 are projected on the display image plane 142. The region on the texture plane 140 (e.g., region 150 or 152) corresponding to each pixel on the display image plane 142 (e.g., pixel 146 or 148) is obtained by inverse transformation. With the present embodiment, the processing involved is made more efficient by linear approximation using partial differential equations.

First, a function f(x, y) for transforming the coordinates (x, y) on the display image plane 142 to corresponding coordinates (u, v) on the texture plane 140 is defined as follows.

$$\begin{bmatrix} u \\ v \end{bmatrix} = f(x, y) = \begin{bmatrix} f1 \ (x, y) \\ f2 \ (x, y) \end{bmatrix} \qquad \text{[Math. 1]}$$

On the display image plane 142, the Taylor expansion of a function f1 at a position of ±d from given position coordinates $(x_0, y_0)$ in the x-axis direction is performed as follows.

$$f1(x_0 + d, y) = \quad \text{[Math. 2]}$$
$$f1(x_0, y_0) + \frac{\partial f1(x_0, y_0)}{\partial x} \cdot d + \cdot \frac{1}{2} \frac{\partial^2 f1(x_0, y_0)}{\partial x^2} d^2 + O(d^3)$$
$$f1(x_0 - d, y) = f1(x_0, y_0) +$$
$$\frac{\partial f1(x_0, y_0)}{\partial x} \cdot d + \cdot \frac{1}{2} \frac{\partial^2 f1(x_0, y_0)}{\partial x^2} d^2 + O(d^3)$$

Obtaining the difference between the above two equations provides the following equation.

$$\frac{f1(x_0 + d, y) - f1(x_0 - d, y)}{2d} = \frac{\partial f1(x_0, y_0)}{\partial x} + O(d^2) \quad \text{[Math. 3]}$$

Then, the Taylor expansion of the function f1 at a position of ±d from the position coordinates ($x_0$, $y_0$) in the y-axis direction is performed likewise, and so is the Taylor expansion of a function f2 at a position of ±d from the position coordinates ($x_0$, $y_0$) in the x-axis and y-axis directions. With these Taylor expansions taken into consideration, the position coordinates (u, v) on the texture plane 140 corresponding to the position coordinates (x, y) away from the position coordinates ($x_0$, $y_0$) by (Δx, Δy) on the display image plane 142 are approximated as follows.

$$\begin{bmatrix} u \\ v \end{bmatrix} = \begin{bmatrix} u_0 \\ v_0 \end{bmatrix} + A \begin{bmatrix} \Delta x \\ \Delta y \end{bmatrix} \quad \text{[Math. 4]}$$
$$A = \begin{bmatrix} a_{11} & a_{12} \\ a_{12} & a_{22} \end{bmatrix}$$

Here, the coordinates ($u_0$, $v_0$) represent the position coordinates on the texture plane 140 corresponding to the position coordinates ($x_0$, $y_0$) on the display image plane 142. In addition, the elements $a_{11}$, $a_{12}$, $a_{21}$ and $a_{22}$ of a matrix A are defined as follows.

$$a_{11} = \frac{\partial f1(x_0, y_0)}{\partial x} + O(d^2) \quad \text{[Math. 5]}$$
$$a_{12} = \frac{\partial f1(x_0, y_0)}{\partial y} + O(d^2)$$
$$a_{21} = \frac{\partial f2(x_0, y_0)}{\partial x} + O(d^2)$$
$$a_{22} = \frac{\partial f2(x_0, y_0)}{\partial y} + O(d^2)$$

According to the above transformation equations, the square region of one pixel on the display image plane 142 is made to correspond to a parallelogram with its sides in the directions of a vector $t_u(a_{11}, a_{21})$ and a vector $t_v(a_{12}, a_{22})$ each having the columns of the matrix A as its components on the texture plane 140.

Figure 14:
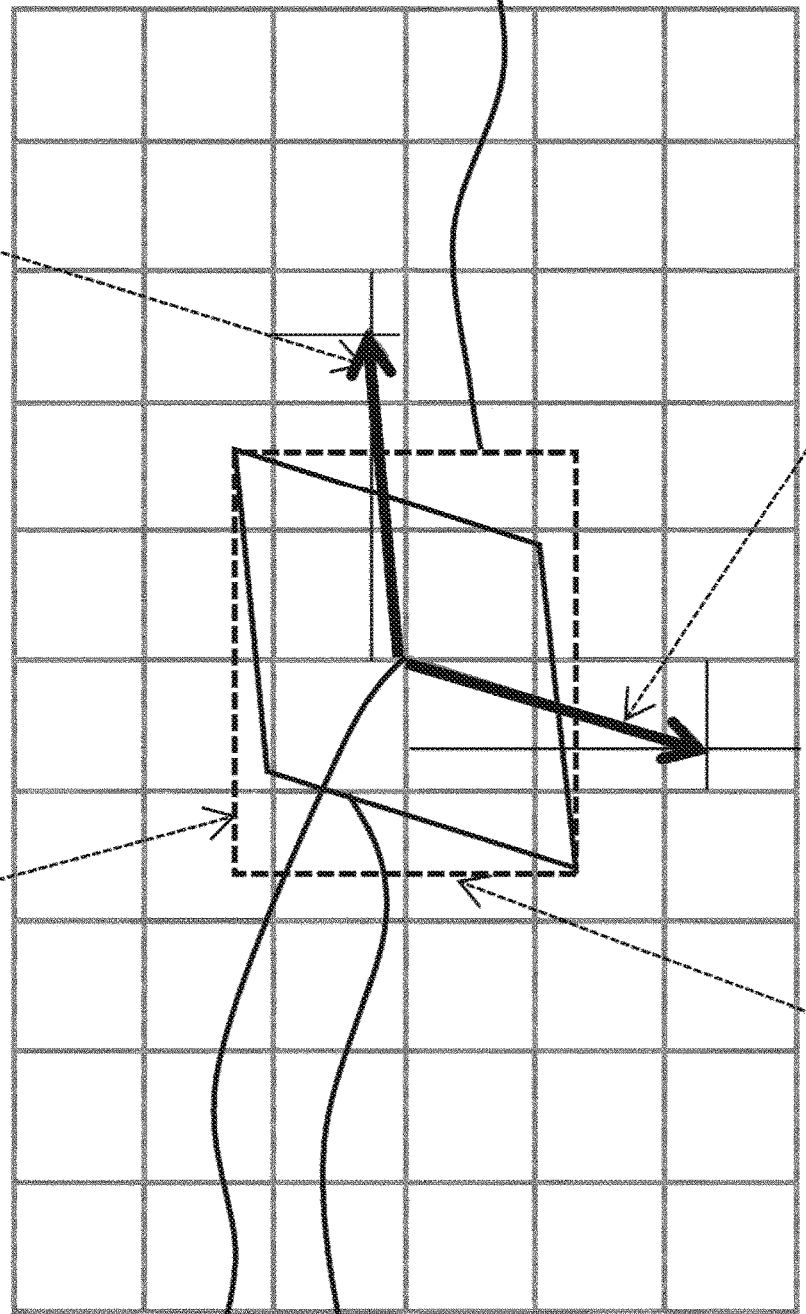
FIG. 14 is a view depicting a typical parallelogram determined on the texture plane by use of transformation equations of the embodiment.

FIG. 14 depicts a typical parallelogram determined on the texture plane by use of the above-described transformation equations. Depicted in FIG. 14 are a region 152 and regions nearby on the texture plane 140 illustrated in FIG. 13. A parallelogram 160 corresponds to the region 152. In addition, the position coordinates ($u_0$, $v_0$) of the center of the parallelogram 160 correspond to the position coordinates ($x_0$, $y_0$) of the center of the original pixel 148 on the display image plane. Further, the functions f1 and f2 at the position coordinates ($u_0$, $v_0$) of the center of the parallelogram 160 are represented by reference characters "u" and "v," respectively.

As described above, the parallelogram 160 has the sides in parallel with the vectors $t_u(a_{11}, a_{21})$=(∂u/∂x, ∂v/∂x) and $t_v(a_{12}, a_{22})$=(∂u/∂y, ∂v/∂y). Further, a rectangle 162 circumscribing the parallelogram 160 has crosswise and longitudinal sides having lengths of Su and Sv respectively, the length Su being the sum of the lengths of the components in the vector $t_u$, the length Sv being the sum of the lengths of the components in the vector G. That is, Su=|∂u/∂x|+|∂u/∂y|, and Sv=|∂v/∂x|+|∂v/∂y|. Here, the vectors $t_u$ and $t_v$ making up the sides of the parallelogram 160 correspond to the vectors du and dv indicated in FIG. 12.

Thus, obtaining new vectors du' and dv' with respect to the velocity vector of the texture as discussed above in reference to FIG. 12 allows the parallelogram 160 to be deformed in a manner determining a parallelogram representing the final reference range. With the present embodiment, further, the number of texel values to be sampled is adjusted in keeping with the size of the final reference range.

FIG. 15 schematically depicts examples of sampling points and their distributions in relation to reference range sizes. This drawing illustrates parts of the texture plane. Each of the minimum unit squares making up a grid-like pattern stands for a texel. Further, the length of the crosswise side of a region of one texel and the length of the longitudinal side thereof are assumed to be one each. First, when the longer of the two sides of the circumscribing rectangle, i.e., the crosswise side having the length Su or the longitudinal side having the length Sv, has a length of at least 1.0 but less than 4.0 as depicted in subfigure (a), four points in the region of the reference range are sampled. That is, the texel values of the sampling points indicated by black circles are read out and used for determining the pixel value.

Whereas subfigure (a) depicts only a maximum-size parallelogram meeting the condition (a) above, i.e., a square with Su=SV=4, the actual reference range may be any one of diverse parallelograms with different distributions of sampling points therein. The same applies to other conditions. Next, when the longer of the two sides of the circumscribing rectangle with the lengths Su and Sv has a length of at least 4.0 but less than 6.0 as depicted in subfigure (b), nine points in the region of the reference range are sampled. When the longer of the two sides of the circumscribing rectangle with the lengths Su and Sv has a length of at least 6.0 but less than 8.0 as depicted in subfigure (c), 16 points in the region of the reference range are sampled.

In a case where the longer side has a length greater than those in the above cases, the number of sampling points and the rules for determining their distributions are set likewise in relation to the size of the circumscribing rectangle. These settings allow the pixel value to be determined by similar calculations regardless of the position and angle of the mapping target plane. It is to be noted that the conditions for changing the numbers of sampling points and the numbers of sampling points are not limited to those depicted in the drawing. As described above, the reference range is a square in this illustrated example, so that the sampling points are distributed at equal distances apart in the crosswise and longitudinal directions. The rules for determining the distribution of sampling points in any parallelograms, including that of the above case, are prepared beforehand.

Figure 16:
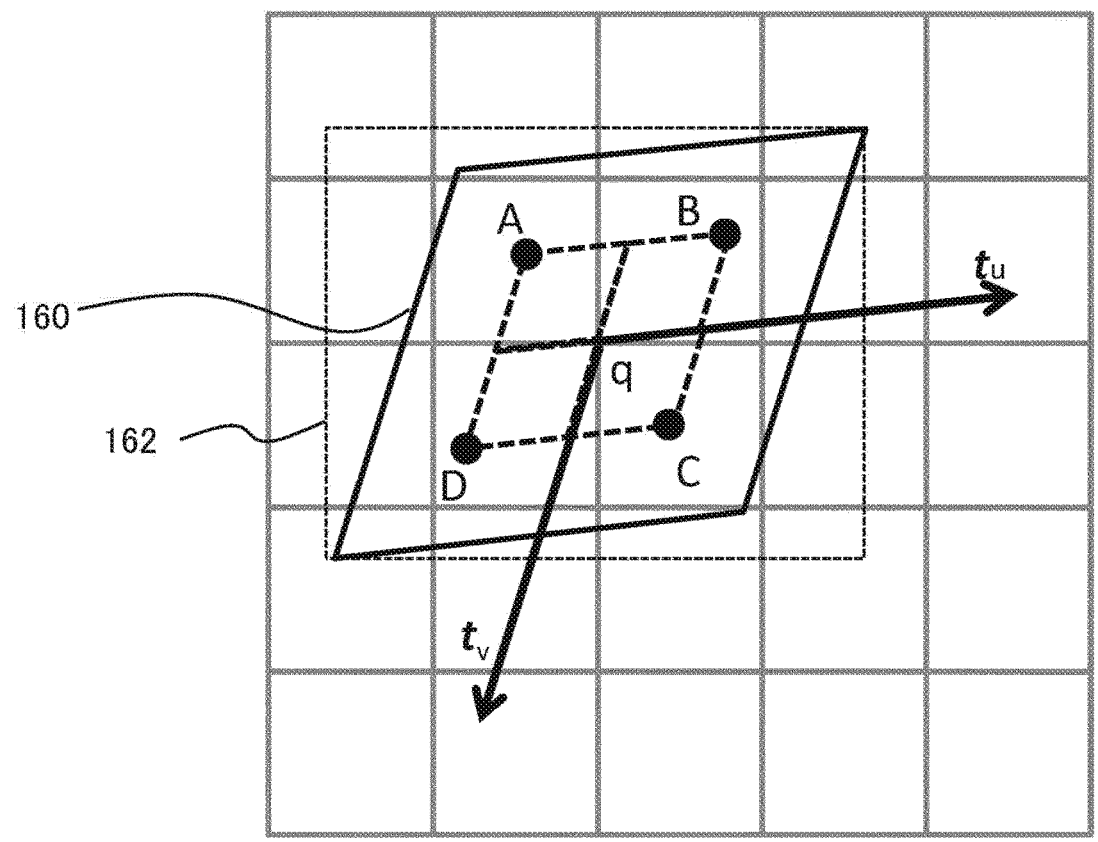
FIG. 16 is a view explaining the rules for determining four sampling points to be sampled with the embodiment.

FIG. 16 is a view explaining the rules for determining four sampling points to be sampled as in the case of the condition (a) in FIG. 15. The parallelogram in FIG. 16 corresponds to the parallelogram 160 in FIG. 14. The rectangle 162 circumscribing the parallelogram 160 meets the condition (a) in FIG. 15, so that there are four sampling points. In this case, vertexes A, B, C, and D of a parallelogram scaled to ½ of the parallelogram 160 in the crosswise and longitudinal directions and having the same center as the center coordinates ($u_0$, $v_0$) of the parallelogram 160 are determined as the sampling points. If "q" is used for the center coordinates ($u_0$, $v_0$), the sampling points A, B, C, and D are expressed by the following equations using the vectors $t_u$ and $t_v$.

$A=q-¼t_u-¼t_v$ $B=q+¼t_u-¼t_v$ $C=q+¼t_u+¼t_v$ $D=q-¼t_u+¼t_v$ [Math. 6]

Figure 17:
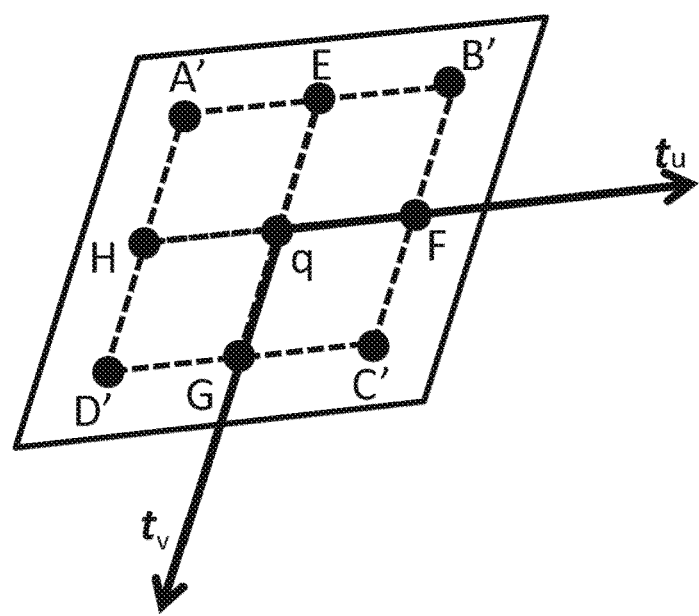
FIG. 17 is a view explaining the rules for determining nine sampling points to be sampled with the embodiment.

FIG. 17 is a view explaining the rules for determining nine sampling points to be sampled as in the case of the condition (b) in FIG. 15. In this case, the nine sampling points are made up of sampling points A' to D' obtained by calculations similar to those for acquiring the four sampling points A to D in FIG. 16, points E, F, G and H each being a midpoint between adjacent two of the points A' to D', and the center point "q." It is to be noted that the points A' to D' are calculated by substituting ⅓ for the factor of the vectors $t_u$ and $t_v$ in the above equations for calculating the points A to D. That is, the nine sampling points are given as q, q±⅓·$t_u$±⅓·$t_v$, q±⅓·$t_u$, and q±⅓·$t_v$.

Figure 18:
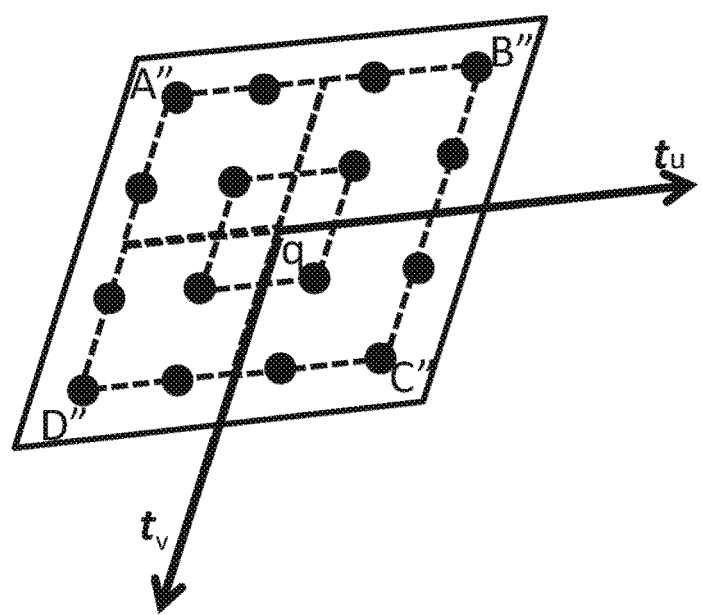
FIG. 18 is a view explaining the rules for determining 16 sampling points to be sampled with the embodiment.

FIG. 18 is a view explaining the rules for determining 16 sampling points to be sampled as in the case of the condition (c) in FIG. 15. In this case, the 16 sampling points are made up of sampling points A" to D" obtained by calculations similar to those for acquiring the four sampling points A to D in FIG. 16, eight points each internally dividing the distance between adjacent two of the points A" to D" to 1:2 and 1:3, and four points each internally dividing the distance between the above points to 1:2 and 2:1 in the direction of either the vector $t_u$ or the vector G. It is to be noted that the points A" to D" are calculated by substituting ⅜ for the factor of the vectors $t_u$ and G in the above equations for calculating the points A to D. That is, the 16 sampling points are given as q±⅜·$t_u$±⅜·$t_v$, q±³⁄₁₆·$t_u$±⅜·$t_v$, q±⅜·$t_u$±³⁄₁₆·$t_v$, and q±³⁄₁₆·$t_u$±³⁄₁₆·$t_v$.

Incidentally, on the assumption that the size of the side of a maximum circumscribing rectangle under each of the conditions depicted in FIG. 15 is defined as 2N (N=2, 3, 4, . . . ), the factor α of the vectors $t_u$ and $t_v$ for determining the four points such as the sampling points A to D closest to the vertexes of the parallelogram is generalized as follows.

α=(N−1)/2N

When these rules are established to determine the number of sampling points and their distributions in relation to the size of the parallelogram, it is possible to sample necessary and sufficient points evenly from the reference range region of the parallelogram. Further, this sampling process can be performed efficiently by use of an existing bilinear sampling circuit. However, these rules are not limitative of how points are sampled in practice with the present embodiment.

Figure 19:
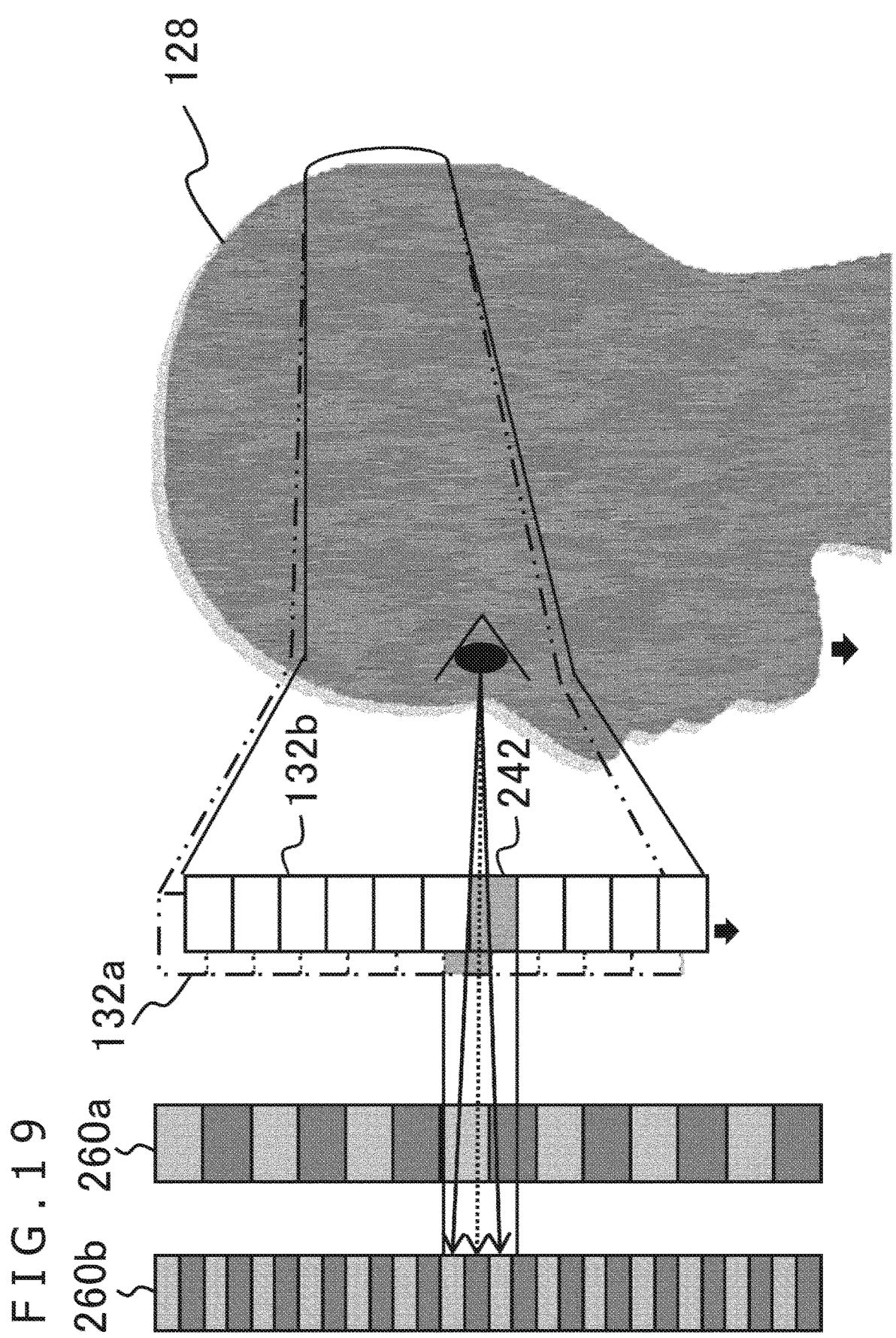
FIG. 19 is a view schematically depicting how the resolution levels of a referenced part of the texture are switched relative to a pixel depending on the velocity of texture movement with respect to the screen with the embodiment.

FIG. 19 schematically depicts how the texture resolution levels of a referenced part are switched relative to a pixel depending on the velocity of texture movement with respect to the screen. FIG. 19, as with FIG. 10, depicts a virtual space as viewed from the side. What is known as mipmap is the technique by which one of multiple resolution levels prepared for the texture is selected appropriately on the basis of the distance between the screen and the display target for mapping purposes. The present embodiment may use general techniques of this type in implementing the data structure of the texture and readout circuits.

In FIG. 19, a texture 260a has an appropriate resolution level determined in accordance with the distance between the screen and the display target. For example, this is the resolution level at which the size of the display image and that of the pixel region of the texture are approximately the same upon projection onto the screen. In a case where the user 128 is stationary and so is the texture relative to the screen, the texture 260a at this appropriate resolution level is referenced.

Here, suppose that the user 128 starts looking downward so that the screen 132a moves to the position of the screen 132b, with a relative movement of the texture thereby being brought about, the referenced part is switched from the texture 260a to a texture 260b at a higher resolution level. In a case where the screen is brought closer to or farther away from the display target, an appropriate resolution level is set temporarily in accordance with rules similar to those of mipmap. After the texture movement velocity resulting from image scaling is additionally taken into account, the resolution level of the referenced part is determined for each pixel.

FIG. 20 qualitatively depicts how the resolution levels of the texture are switched in relation to the movement velocity in a mode in which the reference range of the texture is narrowed relative to the movement velocity in consideration of two-dimensional movements. The manner in which FIG. 20 is presented is approximately the same as in FIG. 11, except that the number of texels projected per pixel of the display image is varied with the switching of the texture resolution levels. In this example, when the velocity of the texture relative to the screen is zero, what is selected is the texture with a resolution such that a block 262a of one texel corresponds to one pixel of the display image.

When the texture is moved relative to the screen so that the movement velocity exceeds a first threshold value, the texture with a resolution 2×2 times higher than that in the stationary case is selected, as indicated by blocks 262b, 262d, and 262f. When the movement velocity exceeds a second threshold value higher than the first threshold value, the texture with a resolution 4×4 times higher than that in the stationary case is selected, as indicated by blocks 262c, 262g, 262e, 262h, and 262i.

As described above, the pixel value is controlled in a manner dependent on the movement velocity while the increase in processing load is minimized by use of the texture with a necessary and sufficient resolution. The same goes for a mode in which the reference range is extended in relation to the increase in the movement velocity. Incidentally, where a mipmap processing setup is used, an LOD (Level of Detail) is specified by offsetting the normal LOD in a manner corresponding to the velocity. This permits switching of the resolution levels in a suitably timed manner in conjunction with mipmap processing.

In the mode in which the resolution levels of the textures are switched, the size of texels corresponding to one pixel of the display image is made smaller as the movement velocity of the texture becomes higher. This is substantially equivalent to narrowing the reference range in keeping with the velocity with solely the resolution being made higher while the number of sampling points being fixed. Most simply, with the number of sampling points being fixed to one, the value of one texel on the texture corresponding to the center of the pixel in the display image may be read out and used as the pixel value.

In that case, however, the reference range is narrowed isotropically regardless of the direction of the velocity vector. In a case where the reference range is to be narrowed only in the direction of the velocity vector, two points on a straight line perpendicular to the velocity vector may be used as sampling points, as indicated by black circles in the drawing. Even where two points are sampled regardless of the velocity as illustrated, the reference range in the velocity direction is made narrower as the resolution level becomes higher. It should be noted that the number of sampling points is not limited to two; there may be three or more sampling points. Preferably, the number of sampling points may be varied with the velocity. In any case, the pixel value is determined by averaging the sampled texel values.

Figure 21:
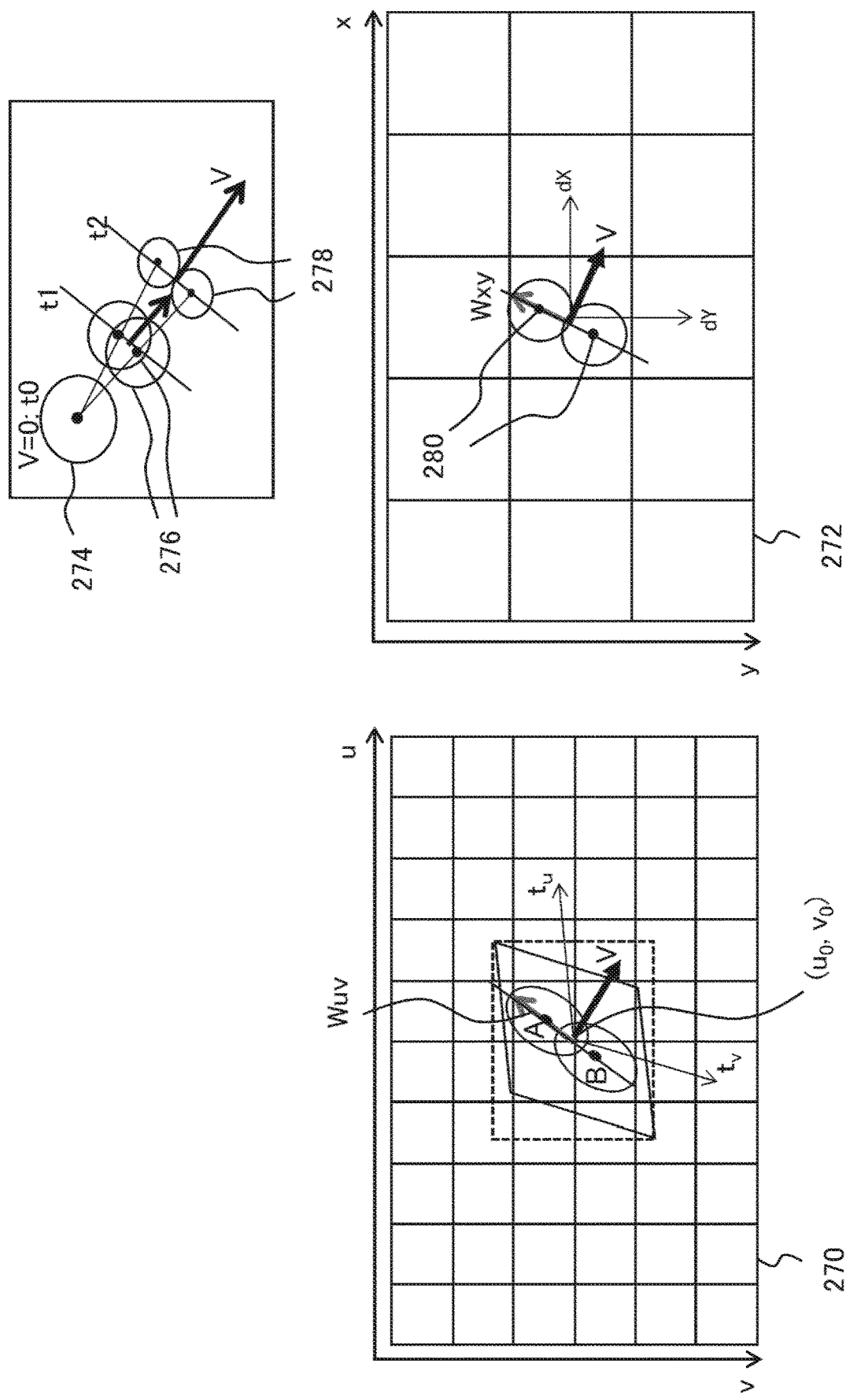
FIG. 21 is a view explaining a method of determining two sampling points on each straight line perpendicular to a velocity vector with the embodiment.

FIG. 21 is a view explaining a method of determining two sampling points on each straight line perpendicular to a velocity vector. The lower left part of the drawing is a texture plane 270, and the lower right part is a display image plane 272. On both planes, each of the minimum unit squares making up a grid-like pattern stands for a pixel. As depicted in the upper part of the drawing, the texture stationary at time t0 is moved from there at an increasing velocity past times t1 and t2 to create a velocity vector V. Two points on each of straight lines perpendicular to the velocity vector V at times t1 and t2 are then sampled. At this time, if the resolution level of the texture is raised in keeping with the increasing velocity, the reference range can be narrowed in the direction of the velocity vector in a manner indicated by regions 274, 276, and 278, as discussed above.

The display image plane 272 in the lower part of the drawing depicts two sampling points 280 determined at a given time on a straight line perpendicular to the velocity vector V. A unit vector Wxy on this straight line is expressed on the texture plane 270 as follows.

$$Wuv = t_u \cdot Wx + t_u \cdot Wy$$

Here, Wx and Wy are an x component and a y component of the vector Wxy, respectively. The two sampling points on the texture plane 270 are each away from the position coordinates $(u_0, v_0)$ on the texture plane corresponding to the center of the pixel in the display image, one point being distant from that position in the positive direction of the vector Wuv and the other point in the negative direction thereof by the amount of a value |Wuv| multiplied by a factor smaller than one.

If "q" is used to denote the coordinates $(u_0, v_0)$, sampling points A and B are determined, for example, as follows.

$$A = q + |V|/2 \cdot Wuv$$

$$B = q - |V|/2 \cdot Wuv$$

The above equations define, as sampling points, two points that are distant by the amount of the velocity V in the direction perpendicular to the velocity vector.

Figure 22:
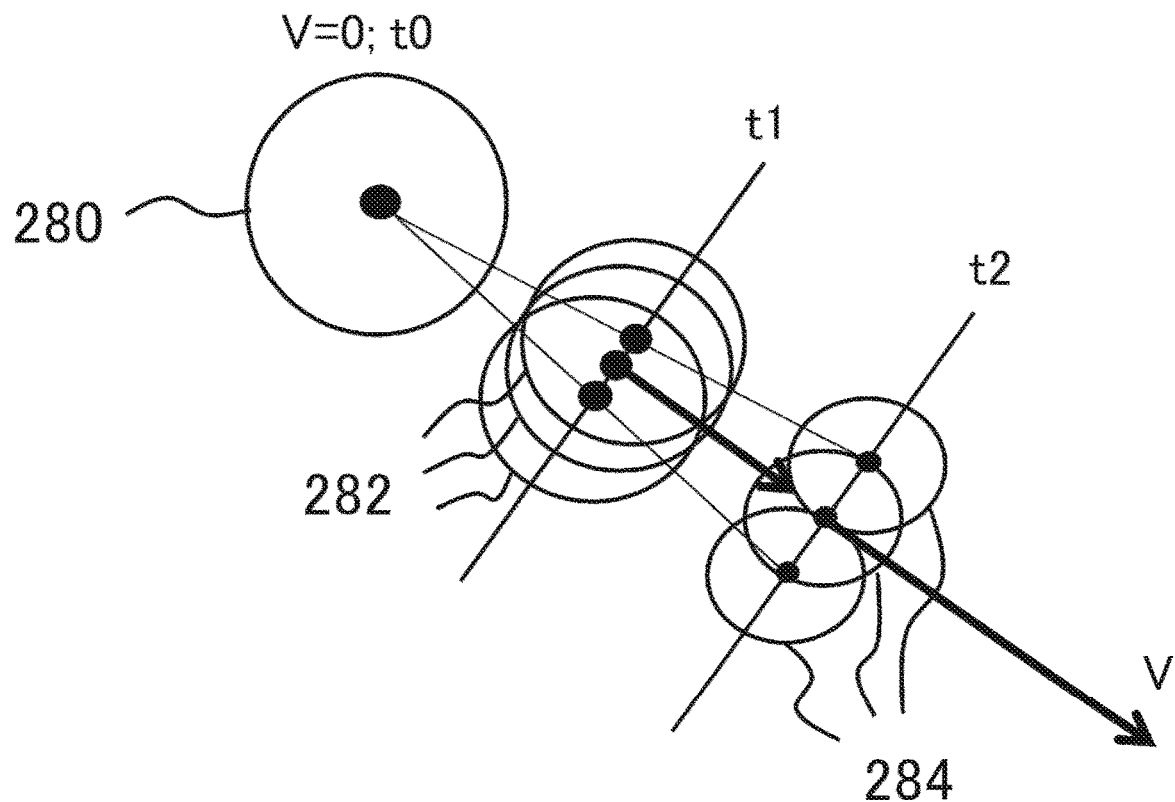
FIG. 22 is a view schematically depicting how three points are sampled on each straight line perpendicular to a velocity vector with the embodiment.

FIG. 22 schematically depicts how three points are sampled on each straight line perpendicular to the velocity vector V. Also in this case, the texture stationary at time t0 is moved past times t1 and t2 at an increasing velocity to form the velocity vector V, with the resolution of the texture being raised over time. Three points in a direction perpendicular to the velocity vector V are then determined. For example, the two sampling points explained above in reference to FIG. 21 are supplemented with a midpoint therebetween as another sampling point. These sampling points A, B, and C are determined as follows.

$$A = q + |V|/2 \cdot Wuv$$

$$B = q$$

$$C = q - |V|/2 \cdot Wuv$$

Figure 23:
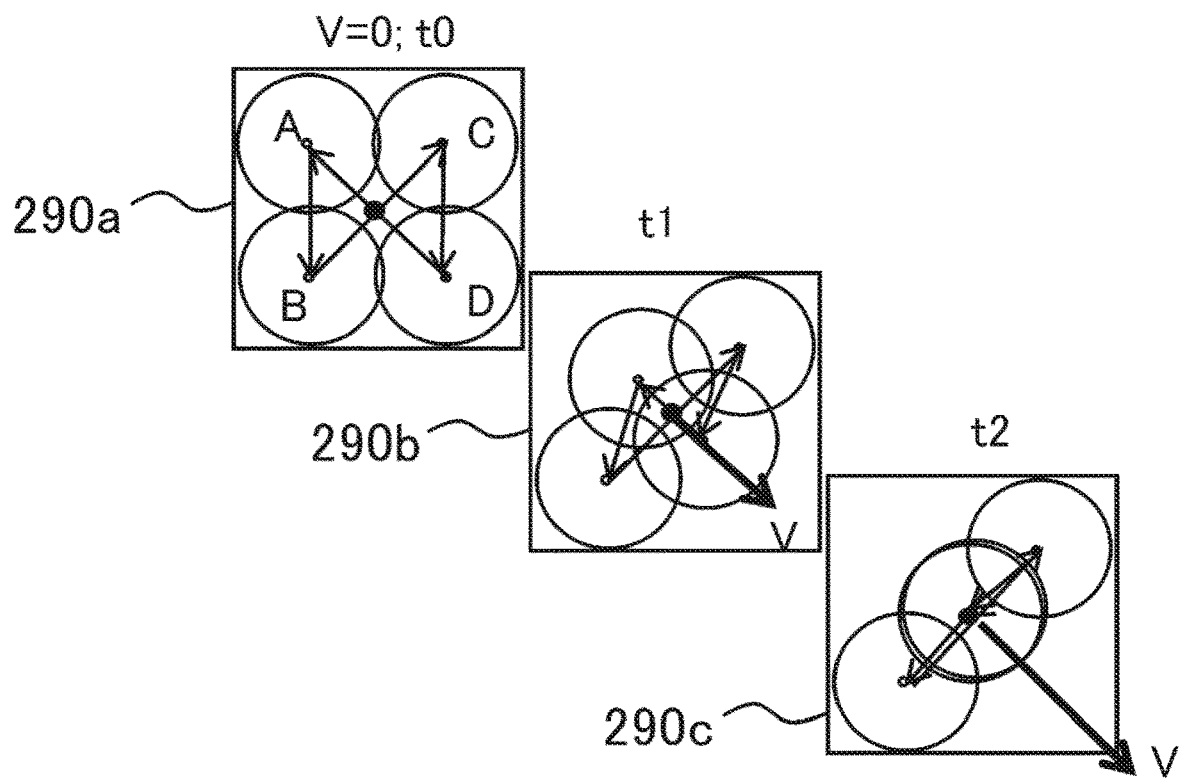
FIG. 23 is a view schematically depicting how sampling is performed in a mode where sampling points are separated in their distribution in the time direction with the embodiment.

In the modes described above, one or multiple sampling points on the texture are determined in relation to the movement velocity of the texture. The texel values of the sampling points are then blended to determine the pixel value of the display image for one frame. On the other hand, the sampling points may be separated in their distribution in the time direction over consecutive frames so that their texel values may be blended cognitively by use of the time integration capability of human visual perception. FIG. 23 schematically depicts how sampling is performed in a mode where sampling points are separated in their distributions in the time direction.

In this mode, the referenced part is the texture of which the resolution level is higher by a predetermined amount than the appropriate resolution for the pixel in the display image. Three rectangles in FIG. 23 represent the regions on the texture corresponding to one pixel in the display image at times t0, t1, and t2. Each of these regions is a block made up of 2×2 texels. First, when the texture is stationary relative to the screen (V=0), sampling points are evenly set at equal distances from the center of a block 290a. In this illustrated example, four sampling points A, B, C, and D are set, each being a midpoint between the center of the block 290a and one of the vertexes of the block 290a.

Where four sampling points are set as in the above case, four frames of the display image are regarded as a unit, with four texel values of the sampling points being displayed successively during the display time of one unit. That is, the texel value of the sampling point A is first read out with respect to the first frame of the unit. The texel values of the sampling points B, C, and D are then read out with regard to the second, third, and fourth frames of the unit to constitute the pixel value. In this case, the user viewing the pixel over the frames of one unit perceives a blend of the colors of the sampling points A, B, C, and D thanks to the time integration capability of human visual perception. As long as the texture is stationary relative to the screen, the texel values of the same sampling points are cyclically read out for display.

In a case where the texture is moved relative to the screen, the reference range is narrowed in the direction of the velocity vector in a manner similar to that described in reference to FIG. 11. At this time, the distribution of sampling points is adjusted in such a manner that the higher the velocity V becomes, the narrower the reference range is made, as indicated by blocks 290b and 290c. The manner in which the reference range is changed with respect to changing velocities may be similar to the manner explained in reference to FIGS. 11 and 12, for example.

As with the case in which the texture is stationary, the texel values of the four sampling points are then read out consecutively over four frames for individual texel display per frame. This provides perception of a blend of the sampling point colors at the time of viewing the frames of one unit. This case also provides advantageous effects similar to those at the time of blending the texels in the reference range with respect to the velocity in the display image of one frame. Further, because one texel value need only be read out per pixel per frame, the processing load involved is made lower than if multiple texel values are simultaneously read out and calculated.

It should be noted that when the referenced part is the texture with a resolution one level higher than the resolution level deemed appropriate for the pixel region of the display image according to a general mipmap technology, the number of texels corresponding to one pixel in the display image is stabilized at approximately 2×2, as illustrated in the drawing. Thus, the illustrated example indicates four sampling points per pixel. However, this sampling point count is not limitative of the present embodiment. In the case where the number of sampling points is assumed to be N per pixel, N frames make up one unit. Preferably, multiple texel values may be read out at a time and blended into the pixel value for one frame. For example, in a case where the pixel value is determined using two texel values, N texels may be represented in N/2 frames.

The mode in which the reference range is narrowed in relation to the increase in the movement velocity of the texture is effective in allowing the user to visually perceive details of a visually tracked display target image moving at a relatively low velocity relative to the screen. On the other hand, similar processing performed on a target not consciously viewed by the user or on a target almost stationary or moving at fairly high velocities can incur problems of aliasing or flickering. For this reason, it is preferred that the reference range be controlled or left uncontrolled and its sensitivity be adjusted adaptively according to movement velocity in consideration of the current circumstances such as the movement velocity of the target object and the user's line of sight.

Figure 24:
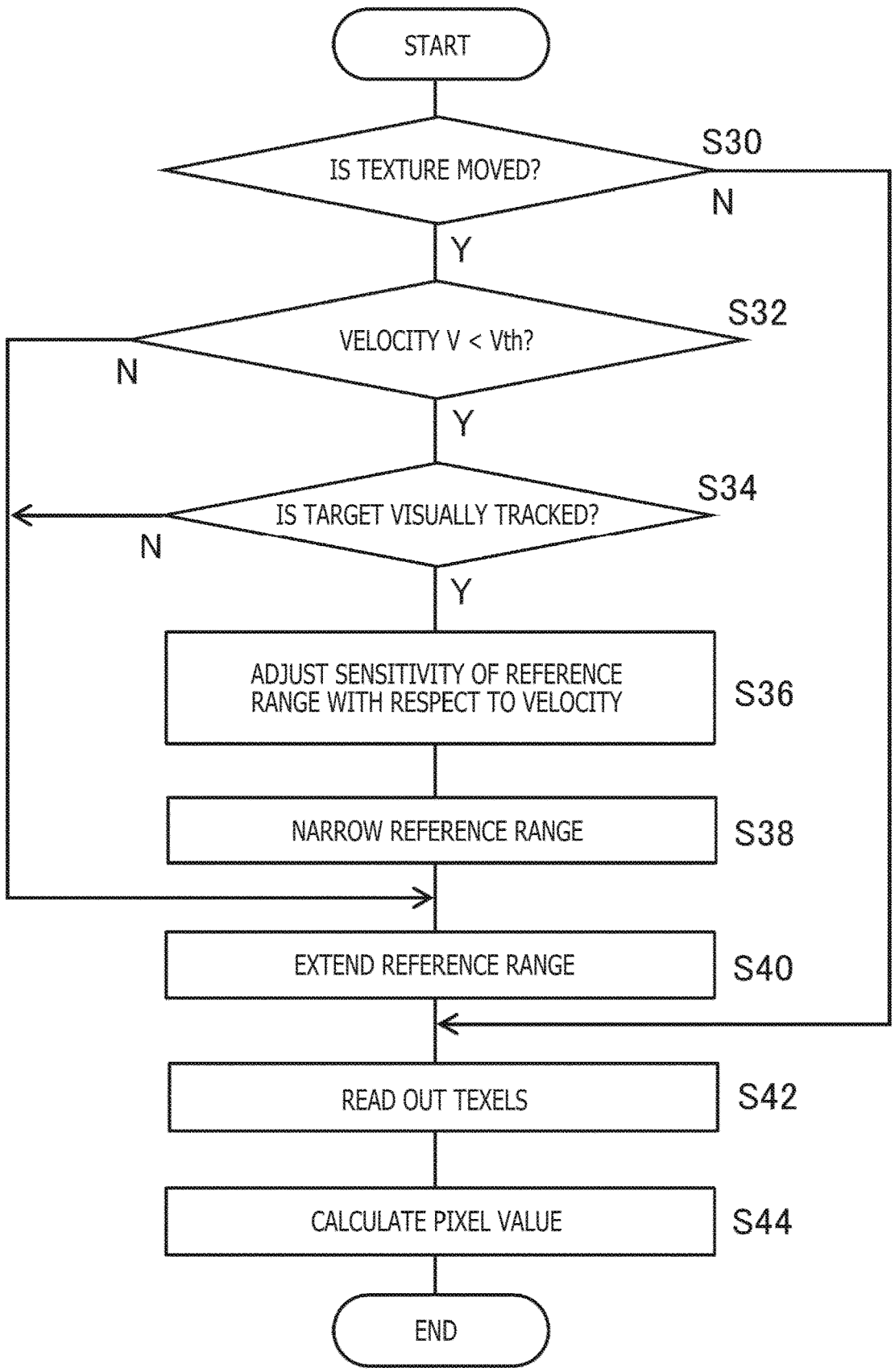
FIG. 24 is a flowchart depicting steps in which the image processing apparatus of the embodiment determines a pixel value in a case where the manner of controlling the texture reference range is changed depending on the circumstances.

FIG. 24 is a flowchart depicting steps in which the image processing apparatus 10 determines a pixel value in a case where the manner of controlling the texture reference range is changed depending on the circumstances. These steps, performed on each pixel, constitute the processing ranging from step S14 to step S20 in the flowchart of FIG. 8. Further, for this mode, it is assumed that the texture referencing section 78 has a visual tracking determining function for determining whether or not the user is visually tracking the display target by successively acquiring measurement results from a point-of-gaze detector that continuously detects the user's point of gaze on the screen.

First, the velocity acquiring section 76 performs monitoring to determine whether the texture is moved relative to the screen (S30). Upon determining that the texture is moved, the velocity acquiring section 76 performs monitoring to determine whether the velocity V is lower than a threshold value Vth (Y in S30, S32). If it is determined that the texture is not moved (N in S30), the values of the texels corresponding to the pixel are read out without adjustment of the reference range (S42). If it is determined that the velocity V is equal to or higher than the threshold value Vth (N in S32), the texel values are read out following extension of the reference range (S40 and S42). Here, the velocity threshold value Vth is assumed to be a velocity at which one pixel of the display image is moved from one frame to another, for example. Preferably, in the case where the velocity V is equal to or higher than the threshold value Vth, the texel values may be read out without adjustment of the reference range.

Even where the velocity V is lower than the threshold value Vth (Y in S32), if the user is not visually tracking the target represented by the pixel of interest (N in S34), the texel values are read out following extension of the reference range (S40 and S42). Generally, the eye movements include characteristically different motion components such as smooth pursuit eye movement, saccadic eye movement, and involuntary eye movement. Visual tracking with the embodiment presupposes the situation in which the target as a whole is visually tracked in a cursory manner by smooth pursuit eye movement. Thus, the texture referencing section 78 monitors, for example, the position coordinates obtained by averaging the points of gaze in a predetermined time window. Upon detecting that the motion vector of the texture or of the display target image coincides with the movement vector obtained by averaging the points of gaze for a predetermined time period, the texture referencing section 78 determines that visual tracking is executed.

It should be noted that there are cases in which visual tracking is estimated to be executed without obtaining the result of detecting the point of gaze in view of displayed details or of the state of the user's operation, as in a case where an electronic book is read on or in a case where a map is scrolled while locations thereon are being checked. In such cases, the process of determining the execution of visual tracking may be omitted. If it is determined that visual tracking is executed on any one of the pixels included in the same target image, it may be assumed that the other pixels are also visually tracked so that their determination process may be omitted. If it is determined that the target is visually tracked (Y in S34), the texture referencing section 78 adjusts the sensitivity of the reference range relative to the velocity according to the velocity vector or the state of visual tracking (S36). Thereafter, the texture referencing section 78 performs adjustments to narrow the reference range in relation to the velocity (S38). Here, the term "sensitivity" refers to the magnitude of changes in the reference range with regard to the increase in velocity.

Even if the movement velocity and movements of the point of gaze meet the prescribed conditions, aliasing can become prominent in some cases. According to the inventors' findings, aliasing becomes conspicuous at a time when the direction of movement of the texture is changed relative to the screen. Further, compared with the flat-screen display, the HMD is prone to incur aliasing on its display as a whole. When situations prone to the development of aliasing are identified by prior experiments so that the sensitivity is reduced if any one of such situations takes place, the deterioration of image quality under control of the reference range is minimized.

The texture referencing section 78 determines the sampling points in a manner reflecting the reference range determined as described above and reads out the texel values accordingly from the texture data (S42). Then, using the texel values read out, the pixel value determining section 82 determines the pixel value of the target pixel as discussed above.

According to the above-described embodiment, the display target is prepared as texture data and mapped to generate the display image. Here, when the texture is moved relative to the plane of the display image, the reference range of the texture for use in determining the pixel value is changed in relation to the velocity of movement of the texture.

In the case where the reference range is extended with respect to the increasing velocity, it is possible not only to express the movement of the display target as a motion blur, for example, but to also suppress discontinuities of the image in the movement direction, the discontinuities being prone to occur at a frame rate lower than that appropriate for the resolution of the display apparatus in use. In the case where the reference range is narrowed, it is possible to display a detailed image in a manner making the most of the resolution of the display apparatus in each frame.

Thus, the above two cases may be used selectively depending on the relative velocity of the texture with respect to the display image plane as well as on the status of whether or not the user is visually tracking the image. The selective use of either case makes it possible to take advantage of the resolution of the display apparatus while minimizing the deterioration of image quality that may result therefrom. Further, when the reference range is adjusted solely in the axial direction of the velocity vector while the components perpendicular to that direction are preserved, it is possible to prevent excessive adjustments from inadvertently lowering image quality.

Further, the resolution levels of the texture in the referenced part are switched depending on the relative velocity of the texture. Specifically, as the velocity is increased, the texture at a higher resolution level is used. This narrows the region of one texel relative to one pixel of the display image, so that sampling the same number of points results naturally in a narrower reference range. In the case where the reference range is extended in keeping with the increase in velocity, the texture at the initial appropriate resolution can still be used in situations in which fine-tuned control is not performed as in the case where the texture is stationary. This minimizes increases in processing costs related to texel value readout and calculations.

In addition, the texels of multiple sampling points in the reference range controlled as per the relative velocity of the texture are expressed successively over multiple frames. In this manner, the texel values are perceived as being blended upon viewing of the multiple frames thanks to the time integration capability of human visual perception. Consequently, the blending provides advantageous effects similar to those discussed above while promoting the efficiency of texel value readout and of the process of calculations.

What the embodiment basically does involves adjusting the reference range in relation to the velocity and determining the sampling points distributed in a manner reflecting such adjustment. In this respect, the shape of the reference range before the adjustment is not limited to anything specific. Thus, the embodiment may be used regardless of how the display target is inclined three-dimensionally relative to the display image plane. As a result, the embodiment has a high affinity with modes in which the display target is viewed from a free viewpoint. The embodiment also allows characters to be clearly viewed when character information such as an electronic book or a website is read on while being scrolled.

The texture at an appropriate resolution level is referenced in keeping with the pixel granularity of the display screen so as to control the reference range of the texture with a resolution appropriate for that granularity. This enables stable image expression regardless of the combination of the resolution of the display apparatus with the frame rate thereof.

The present invention has been described above in conjunction with a specific embodiment. It is to be understood by those skilled in the art that suitable combinations of the constituent elements and of various processes of the embodiment described above as examples will lead to further variations of the present invention and that such variations also fall within the scope of the present invention.

REFERENCE SIGNS LIST

8 Image processing system, 10 Image processing apparatus, 14 Input apparatus, 16 Display apparatus, 72 Input information acquiring section, 74 Texture region acquiring section, 76 Velocity acquiring section, 78 Texture referencing section, 80 Texture storing section, 82 Pixel value determining section, 84 Output section

INDUSTRIAL APPLICABILITY

As described above, the present invention may be applied to diverse types of information processing apparatuses such as an image display apparatus, an image reproduction apparatus, game machines, a personal computer, and mobile terminals, as well as to information processing systems each including any one of such apparatuses.

The invention claimed is:

1. An image processing apparatus comprising:
   a velocity acquiring section configured to acquire a movement velocity vector of a texture relative to a plane of a display image for each pixel in the display image that represents the texture, where the texture includes a higher resolution of texels than a resolution of the pixels in the display image;
   a texture referencing section configured to adjust, for each of a plurality of references ranges of texels, a respective size and shape of such reference range and thereby contain a respective sub-set of the texels, before sampling texel values of the respective sub-set of texels therein;
   a pixel value determining section configured to determine, for each pixel in the display image that represents the texture, a respective pixel value that represents the sampled texel values of the respective sub-set of texels within a corresponding one of the plurality of reference ranges;
   a gaze detector configured to determine whether a user's gaze is visually tracking a moving target portion within the display image representing the movement velocity vector of the texture; and
   an output section configured to output data for each determined pixel value of the display image, wherein:
   the texture referencing section is configured to adjust the respective size and shape of each reference range in accordance with first and second modes,
   the first mode is invoked when the gaze detector determines that the user's gaze is not visually tracking a moving target portion within the display image that represents the movement velocity vector of the texture, and in the first mode, the texture referencing section adjusts the respective size and shape of each reference range to expand such that at least one dimension thereof, corresponding to an axial direction of the movement velocity vector, increases to include a higher number of texels in each respective sub-set of the texels, and
   the second mode is invoked when the gaze detector determines that the user's gaze is visually tracking the moving target portion within the display image, and in the second mode, the texture referencing section adjusts the respective size and shape of each reference range to reduce such that at least one dimension thereof, corresponding to an axial direction of the movement velocity vector, does not increase as compared to the first mode.

2. The image processing apparatus according to claim 1, wherein the texture referencing section either extends or narrows the reference ranges in the axial direction of the movement velocity vector in keeping with an increase in the movement velocity of the texture.

3. The image processing apparatus according to claim 1, wherein the texture referencing section switches whether or not to adjust the reference ranges according to the movement velocity of the texture.

4. The image processing apparatus according to claim 2, wherein the texture referencing section switches whether to extend or to narrow the reference ranges in keeping with the increase in the movement velocity of the texture on a basis of a change over time of a point of gaze of a user.

5. The image processing apparatus according to claim 1, further comprising:
a texture storing section configured to store data of the texture at a plurality of resolution levels,
wherein the texture referencing section switches a resolution level of the texture in a referenced part to a higher resolution level in keeping with an increase in the movement velocity of the texture.

6. The image processing apparatus according to claim 5, wherein the texture referencing section sets a predetermined number of sampling points in a region of the texture corresponding to a pixel of the display image without respect to the movement velocity of the texture and narrows the reference range in keeping with the increase in the movement velocity of the texture.

7. The image processing apparatus according to claim 6, wherein the texture referencing section sets the predetermined number of sampling points on a straight line perpendicular to the movement velocity vector.

8. The image processing apparatus according to claim 1, wherein the pixel value determining section determines a plurality of pixel values for each respective pixel on a basis of the texel values in the reference range, the pixel value determining section further presenting the plurality of pixel values successively over a plurality of frames of the display image.

9. The image processing apparatus according to claim 1, wherein the pixel value determining section determines the respective pixel values by convolving the texel values using a window function corresponding to the movement velocity vector.

10. The image processing apparatus according to claim 1, further comprising:
a texture region acquiring section configured to acquire a texture region in the display image by projecting a surface of a display target expressed by the texture onto the display image plane,
wherein the texture referencing section identifies a region of a texture plane corresponding to one pixel in the texture region on a basis of a result of the projection, the texture referencing section further deforming the texture plane region according to the movement velocity vector so as to adjust the reference range.

11. A display image generating method performed by an image processing apparatus, comprising:
acquiring a movement velocity vector of a texture relative to a plane of a display image for each pixel in the display image that represents the texture, where the texture includes a higher resolution of texels than a resolution of the pixels in the display image;
adjusting, for each of a plurality of references ranges of texels, a respective size and shape of such reference range and thereby contain a respective sub-set of the texels, before sampling texel values of the respective sub-set of texels therein;
determining, for each pixel in the display image that represents the texture, a respective pixel value that represents the sampled texel values of the respective sub-set of texels within a corresponding one of the plurality of reference ranges;
determining whether a user's gaze is visually tracking a moving target portion within the display image representing the movement velocity vector of the texture; and
outputting data for each determined pixel value of the display image, wherein:
the adjusting includes adjusting the respective size and shape of each reference range in accordance with first and second modes,
the first mode is invoked when the determining results in determining that the user's gaze is not visually tracking a moving target portion within the display image that represents the movement velocity vector of the texture, and in the first mode, the adjusting includes adjusting the respective size and shape of each reference range to expand such that at least one dimension thereof, corresponding to an axial direction of the movement velocity vector, increases to include a higher number of texels in each respective sub-set of the texels, and
the second mode is invoked when the determining results in determining that the user's gaze is visually tracking the moving target portion within the display image, and in the second mode, the adjusting includes adjusting the respective size and shape of each reference range to reduce such that at least one dimension thereof, corresponding to an axial direction of the movement velocity vector, does not increase as compared to the first mode.

12. A non-transitory, computer-readable storage medium containing a computer program, which when executed by a computer, causes the computer to carry out actions, comprising:
acquiring a movement velocity vector of a texture relative to a plane of a display image for each pixel in the display image that represents the texture, where the texture includes a higher resolution of texels than a resolution of the pixels in the display image;
adjusting, for each of a plurality of references ranges of texels, a respective size and shape of such reference range and thereby contain a respective sub-set of the texels, before sampling texel values of the respective sub-set of texels therein;
determining, for each pixel in the display image that represents the texture, a respective pixel value that represents the sampled texel values of the respective sub-set of texels within a corresponding one of the plurality of reference ranges;
determining whether a user's gaze is visually tracking a moving target portion within the display image representing the movement velocity vector of the texture; and
outputting data for each determined pixel value of the display image, wherein:
the adjusting includes adjusting the respective size and shape of each reference range in accordance with first and second modes,
the first mode is invoked when the determining results in determining that the user's gaze is not visually tracking a moving target portion within the display image that represents the movement velocity vector of the texture, and in the first mode, the adjusting includes adjusting the respective size and shape of each reference range to expand such that at least one dimension thereof, corresponding to an axial direction of the movement velocity vector, increases to include a higher number of texels in each respective sub-set of the texels, and the second mode is invoked when the determining results in determining that the user's gaze is visually tracking the moving target portion within the display image, and in the second mode, the adjusting includes adjusting the respective size and shape of each reference range to reduce such that at least one dimension thereof, corresponding to an axial direction of the movement velocity vector, does not increase as compared to the first mode.

\* \* \* \* \*